US010540976B2

(12) United States Patent
Van Os et al.

(10) Patent No.: US 10,540,976 B2
(45) Date of Patent: Jan. 21, 2020

(54) CONTEXTUAL VOICE COMMANDS

(75) Inventors: Marcel Van Os, San Francisco, CA (US); Gregory Novick, Santa Clara, CA (US); Scott Herz, San Jose, CA (US)

(73) Assignee: APPLE INC., Cupertino, CA (US)

( * ) Notice: Subject to any disclaimer, the term of this patent is extended or adjusted under 35 U.S.C. 154(b) by 409 days.

(21) Appl. No.: 12/479,477

(22) Filed: Jun. 5, 2009

(65) Prior Publication Data

US 2010/0312547 A1 Dec. 9, 2010

(51) Int. Cl.
| | |
|---|---|
| *G10L 15/00* | (2013.01) |
| *G10L 21/00* | (2013.01) |
| *G10L 25/00* | (2013.01) |
| *G10L 21/06* | (2013.01) |
| *G10L 15/26* | (2006.01) |
| *G06F 3/16* | (2006.01) |
| *G10L 15/22* | (2006.01) |

(52) U.S. Cl.
CPC .............. *G10L 15/26* (2013.01); *G06F 3/167* (2013.01); *G10L 15/22* (2013.01); *G10L 2015/228* (2013.01)

(58) Field of Classification Search
CPC ..... G10L 15/22; G10L 15/26; G10L 15/1822; G10L 2015/088; G06F 3/167; G06F 17/24; G06F 17/21; G06F 3/0236; G06F 3/0482; G06F 3/04842
USPC ..................................... 704/9, 235, 270, 275
See application file for complete search history.

(56) References Cited

U.S. PATENT DOCUMENTS

| | | | |
|---|---|---|---|
| 3,704,345 | A | 11/1972 | Coker et al. |
| 3,828,132 | A | 8/1974 | Flanagan et al. |
| 3,979,557 | A | 9/1976 | Schulman et al. |
| 4,278,838 | A | 7/1981 | Antonov |
| 4,282,405 | A | 8/1981 | Taguchi |
| 4,310,721 | A | 1/1982 | Manley et al. |
| 4,348,553 | A | 9/1982 | Baker et al. |
| 4,653,021 | A | 3/1987 | Takagi |
| 4,688,195 | A | 8/1987 | Thompson et al. |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

Keleher, Erin et al., vlingo, "Vlingo Launches Voice Enablement Application on Apple App Store," *Vlingo for iPhone Allows Users to Search the Web, Use Google Maps, Dial Phone numbers and Update their Facebook and Twitter Accounts All by Speaking into the Device*. Cambridge, Mass. Dec. 3, 2008; www.vlingo.com, 2 pages.

(Continued)

*Primary Examiner* — Olujimi A Adesanya
(74) *Attorney, Agent, or Firm* — Dentons US LLP

(57) ABSTRACT

Among other things, techniques and systems are disclosed for implementing contextual voice commands. On a device, a data item in a first context is displayed. On the device, a physical input selecting the displayed data item in the first context is received. On the device, a voice input that relates the selected data item to an operation in a second context is received. The operation is performed on the selected data item in the second context.

24 Claims, 10 Drawing Sheets

(56) References Cited

U.S. PATENT DOCUMENTS

| | | | |
|---|---|---|---|
| 4,692,941 | A | 9/1987 | Jacks et al. |
| 4,718,094 | A | 1/1988 | Bahl et al. |
| 4,724,542 | A | 2/1988 | Williford |
| 4,726,065 | A | 2/1988 | Froessl |
| 4,727,354 | A | 2/1988 | Lindsay |
| 4,776,016 | A | 10/1988 | Hansen |
| 4,783,807 | A | 11/1988 | Marley |
| 4,811,243 | A | 3/1989 | Racine |
| 4,819,271 | A | 4/1989 | Bahl et al. |
| 4,827,520 | A | 5/1989 | Zeinstra |
| 4,829,576 | A | 5/1989 | Porter |
| 4,833,712 | A | 5/1989 | Bahl et al. |
| 4,839,853 | A | 6/1989 | Deerwester et al. |
| 4,852,168 | A | 7/1989 | Sprague |
| 4,862,504 | A | 8/1989 | Nomura |
| 4,878,230 | A | 10/1989 | Murakami et al. |
| 4,903,305 | A | 2/1990 | Gillick et al. |
| 4,905,163 | A | 2/1990 | Garber et al. |
| 4,914,586 | A | 4/1990 | Swinehart et al. |
| 4,914,590 | A | 4/1990 | Loatman et al. |
| 4,944,013 | A | 7/1990 | Gouvianakis et al. |
| 4,955,047 | A | 9/1990 | Morganstein et al. |
| 4,965,763 | A | 10/1990 | Zamora |
| 4,974,191 | A | 11/1990 | Amirghodsi et al. |
| 4,977,598 | A | 12/1990 | Doddington et al. |
| 4,992,972 | A | 2/1991 | Brooks et al. |
| 5,010,574 | A | 4/1991 | Wang |
| 5,020,112 | A | 5/1991 | Chou |
| 5,021,971 | A | 6/1991 | Lindsay |
| 5,022,081 | A | 6/1991 | Hirose et al. |
| 5,027,406 | A | 6/1991 | Roberts et al. |
| 5,031,217 | A | 7/1991 | Nishimura |
| 5,032,989 | A | 7/1991 | Tornetta |
| 5,040,218 | A | 8/1991 | Vitale et al. |
| 5,047,617 | A | 9/1991 | Bianco |
| 5,057,915 | A | 10/1991 | Kohorn et al. |
| 5,072,452 | A | 12/1991 | Brown et al. |
| 5,091,945 | A | 2/1992 | Kleijn |
| 5,127,053 | A | 6/1992 | Koch |
| 5,127,055 | A | 6/1992 | Larkey |
| 5,128,672 | A | 7/1992 | Kaehler |
| 5,133,011 | A | 7/1992 | McKiel, Jr. |
| 5,142,584 | A | 8/1992 | Ozawa |
| 5,164,900 | A | 11/1992 | Bernath |
| 5,165,007 | A | 11/1992 | Bahl et al. |
| 5,179,652 | A | 1/1993 | Rozmanith et al. |
| 5,194,950 | A | 3/1993 | Murakami et al. |
| 5,197,005 | A | 3/1993 | Shwartz et al. |
| 5,199,077 | A | 3/1993 | Wilcox et al. |
| 5,202,952 | A | 4/1993 | Gillick et al. |
| 5,208,862 | A | 5/1993 | Ozawa |
| 5,216,747 | A | 6/1993 | Hardwick et al. |
| 5,220,639 | A | 6/1993 | Lee |
| 5,220,657 | A | 6/1993 | Bly et al. |
| 5,222,146 | A | 6/1993 | Bahl et al. |
| 5,230,036 | A | 7/1993 | Akamine et al. |
| 5,235,680 | A | 8/1993 | Bijnagte |
| 5,267,345 | A | 11/1993 | Brown et al. |
| 5,268,990 | A | 12/1993 | Cohen et al. |
| 5,282,265 | A | 1/1994 | Rohra Suda et al. |
| RE34,562 | E | 3/1994 | Murakami et al. |
| 5,291,286 | A | 3/1994 | Murakami et al. |
| 5,293,448 | A | 3/1994 | Honda |
| 5,293,452 | A | 3/1994 | Picone et al. |
| 5,297,170 | A | 3/1994 | Eyuboglu et al. |
| 5,301,109 | A | 4/1994 | Landauer et al. |
| 5,303,406 | A | 4/1994 | Hansen et al. |
| 5,309,359 | A | 5/1994 | Katz et al. |
| 5,317,507 | A | 5/1994 | Gallant |
| 5,317,647 | A | 5/1994 | Pagallo |
| 5,325,297 | A | 6/1994 | Bird et al. |
| 5,325,298 | A | 6/1994 | Gallant |
| 5,327,498 | A | 7/1994 | Hamon |
| 5,333,236 | A | 7/1994 | Bahl et al. |
| 5,333,275 | A | 7/1994 | Wheatley et al. |
| 5,345,536 | A | 9/1994 | Hoshimi et al. |
| 5,349,645 | A | 9/1994 | Zhao |
| 5,353,377 | A | 10/1994 | Kuroda et al. |
| 5,377,301 | A | 12/1994 | Rosenberg et al. |
| 5,377,303 | A | 12/1994 | Firman |
| 5,384,892 | A | 1/1995 | Strong |
| 5,384,893 | A | 1/1995 | Hutchins |
| 5,386,494 | A | 1/1995 | White |
| 5,386,556 | A | 1/1995 | Hedin et al. |
| 5,390,279 | A | 2/1995 | Strong |
| 5,396,625 | A | 3/1995 | Parkes |
| 5,400,434 | A | 3/1995 | Pearson |
| 5,404,295 | A | 4/1995 | Katz et al. |
| 5,412,756 | A | 5/1995 | Bauman et al. |
| 5,412,804 | A | 5/1995 | Krishna |
| 5,412,806 | A | 5/1995 | Du et al. |
| 5,418,951 | A | 5/1995 | Damashek |
| 5,424,947 | A | 6/1995 | Nagao et al. |
| 5,434,777 | A | 7/1995 | Luciw |
| 5,444,823 | A | 8/1995 | Nguyen |
| 5,455,888 | A | 10/1995 | Iyengar et al. |
| 5,469,529 | A | 11/1995 | Bimbot et al. |
| 5,471,611 | A | 11/1995 | McGregor |
| 5,475,587 | A | 12/1995 | Anick et al. |
| 5,479,488 | A | 12/1995 | Lenning et al. |
| 5,491,772 | A | 2/1996 | Hardwick et al. |
| 5,493,677 | A | 2/1996 | Balogh |
| 5,495,604 | A | 2/1996 | Harding et al. |
| 5,502,790 | A | 3/1996 | Yi |
| 5,502,791 | A | 3/1996 | Nishimura et al. |
| 5,515,475 | A | 5/1996 | Gupta et al. |
| 5,536,902 | A | 7/1996 | Serra et al. |
| 5,537,618 | A | 7/1996 | Boulton et al. |
| 5,574,823 | A | 11/1996 | Hassanein et al. |
| 5,577,164 | A * | 11/1996 | Kaneko et al. ............... 704/275 |
| 5,577,241 | A | 11/1996 | Spencer |
| 5,578,808 | A | 11/1996 | Taylor |
| 5,579,436 | A | 11/1996 | Chou et al. |
| 5,581,655 | A | 12/1996 | Cohen et al. |
| 5,584,024 | A | 12/1996 | Shwartz |
| 5,596,676 | A | 1/1997 | Swaminathan et al. |
| 5,596,994 | A | 1/1997 | Bro |
| 5,608,624 | A | 3/1997 | Luciw |
| 5,613,036 | A | 3/1997 | Strong |
| 5,617,507 | A | 4/1997 | Lee et al. |
| 5,619,694 | A | 4/1997 | Shimazu |
| 5,621,859 | A | 4/1997 | Schwartz et al. |
| 5,621,903 | A | 4/1997 | Luciw et al. |
| 5,642,464 | A | 6/1997 | Yue et al. |
| 5,642,519 | A | 6/1997 | Martin |
| 5,644,727 | A | 7/1997 | Atkins |
| 5,664,055 | A | 9/1997 | Kroon |
| 5,675,819 | A | 10/1997 | Schuetze |
| 5,682,539 | A | 10/1997 | Conrad et al. |
| 5,687,077 | A | 11/1997 | Gough, Jr. |
| 5,696,962 | A | 12/1997 | Kupiec |
| 5,701,400 | A | 12/1997 | Amado |
| 5,706,442 | A | 1/1998 | Anderson et al. |
| 5,710,886 | A | 1/1998 | Christensen et al. |
| 5,712,957 | A | 1/1998 | Waibel et al. |
| 5,715,468 | A | 2/1998 | Budzinski |
| 5,721,827 | A | 2/1998 | Logan et al. |
| 5,727,950 | A | 3/1998 | Cook et al. |
| 5,729,694 | A | 3/1998 | Holzrichter et al. |
| 5,732,390 | A | 3/1998 | Katayanagi et al. |
| 5,734,791 | A | 3/1998 | Acero et al. |
| 5,737,734 | A | 4/1998 | Schultz |
| 5,748,974 | A | 5/1998 | Johnson |
| 5,749,081 | A | 5/1998 | Whiteis |
| 5,759,101 | A | 6/1998 | Von Kohorn |
| 5,777,614 | A | 7/1998 | Ando et al. |
| 5,790,978 | A | 8/1998 | Olive et al. |
| 5,794,050 | A | 8/1998 | Dahlgren et al. |
| 5,794,182 | A | 8/1998 | Manduchi et al. |
| 5,794,207 | A | 8/1998 | Walker et al. |
| 5,794,237 | A | 8/1998 | Gore, Jr. |
| 5,799,276 | A | 8/1998 | Komissarchik et al. |
| 5,822,743 | A | 10/1998 | Gupta et al. |
| 5,825,881 | A | 10/1998 | Colvin, Sr. |

(56) References Cited

U.S. PATENT DOCUMENTS

| | | | |
|---|---|---|---|
| 5,826,261 A | 10/1998 | Spencer | |
| 5,828,999 A | 10/1998 | Bellegarda et al. | |
| 5,835,893 A | 11/1998 | Ushioda | |
| 5,839,106 A | 11/1998 | Bellegarda | |
| 5,845,255 A | 12/1998 | Mayaud | |
| 5,857,184 A | 1/1999 | Lynch | |
| 5,860,063 A | 1/1999 | Gorin et al. | |
| 5,862,233 A | 1/1999 | Walker et al. | |
| 5,864,806 A | 1/1999 | Mokbel et al. | |
| 5,864,844 A | 1/1999 | James et al. | |
| 5,867,799 A | 2/1999 | Lang et al. | |
| 5,873,056 A | 2/1999 | Liddy et al. | |
| 5,875,437 A | 2/1999 | Atkins | |
| 5,884,323 A | 3/1999 | Hawkins et al. | |
| 5,893,063 A * | 4/1999 | Loats | G10L 15/26 704/270 |
| 5,895,464 A | 4/1999 | Bhandari et al. | |
| 5,895,466 A | 4/1999 | Goldberg et al. | |
| 5,899,972 A | 5/1999 | Miyazawa et al. | |
| 5,913,193 A | 6/1999 | Huang et al. | |
| 5,915,249 A | 6/1999 | Spencer | |
| 5,930,769 A | 7/1999 | Rose | |
| 5,933,822 A | 8/1999 | Braden-Harder et al. | |
| 5,936,926 A | 8/1999 | Yokouchi et al. | |
| 5,940,811 A | 8/1999 | Norris | |
| 5,941,944 A | 8/1999 | Messerly | |
| 5,943,670 A | 8/1999 | Prager | |
| 5,948,040 A | 9/1999 | DeLorme et al. | |
| 5,956,699 A | 9/1999 | Wong et al. | |
| 5,960,422 A | 9/1999 | Prasad | |
| 5,963,924 A | 10/1999 | Williams et al. | |
| 5,966,126 A | 10/1999 | Szabo | |
| 5,970,474 A | 10/1999 | LeRoy et al. | |
| 5,974,146 A | 10/1999 | Randle et al. | |
| 5,982,891 A | 11/1999 | Ginter et al. | |
| 5,987,132 A | 11/1999 | Rowney | |
| 5,987,140 A | 11/1999 | Rowney et al. | |
| 5,987,404 A | 11/1999 | Della Pietra et al. | |
| 5,987,440 A | 11/1999 | O'Neil et al. | |
| 6,016,471 A | 1/2000 | Kuhn et al. | |
| 6,023,684 A | 2/2000 | Pearson | |
| 6,024,288 A | 2/2000 | Gottlich et al. | |
| 6,026,345 A | 2/2000 | Shah et al. | |
| 6,026,375 A | 2/2000 | Hall et al. | |
| 6,026,388 A | 2/2000 | Liddy et al. | |
| 6,026,393 A | 2/2000 | Gupta et al. | |
| 6,029,132 A | 2/2000 | Kuhn et al. | |
| 6,038,533 A | 3/2000 | Buchsbaum et al. | |
| 6,052,656 A | 4/2000 | Suda et al. | |
| 6,055,514 A | 4/2000 | Wren | |
| 6,055,531 A | 4/2000 | Bennett et al. | |
| 6,064,960 A | 5/2000 | Bellegarda et al. | |
| 6,070,139 A | 5/2000 | Miyazawa et al. | |
| 6,070,147 A | 5/2000 | Harms et al. | |
| 6,076,051 A | 6/2000 | Messerly et al. | |
| 6,076,088 A | 6/2000 | Paik et al. | |
| 6,078,914 A | 6/2000 | Redfern | |
| 6,081,750 A | 6/2000 | Hoffberg et al. | |
| 6,081,774 A | 6/2000 | de Hita et al. | |
| 6,094,649 A | 6/2000 | Bowen et al. | |
| 6,088,671 A | 7/2000 | Gould et al. | |
| 6,088,731 A | 7/2000 | Kiraly et al. | |
| 6,105,865 A | 8/2000 | Hardesty | |
| 6,108,627 A | 8/2000 | Sabourin | |
| 6,119,101 A | 9/2000 | Peckover | |
| 6,122,616 A | 9/2000 | Henton | |
| 6,125,356 A | 9/2000 | Brockman et al. | |
| 6,144,938 A | 11/2000 | Surace et al. | |
| 6,161,084 A | 12/2000 | Messerly et al. | |
| 6,173,261 B1 | 1/2001 | Arai et al. | |
| 6,173,279 B1 | 1/2001 | Levin et al. | |
| 6,177,905 B1 | 1/2001 | Welch | |
| 6,188,999 B1 | 2/2001 | Moody | |
| 6,195,641 B1 | 2/2001 | Loring et al. | |
| 6,205,456 B1 | 3/2001 | Nakao | |
| 6,208,971 B1 | 3/2001 | Bellegarda et al. | |
| 6,233,559 B1 | 5/2001 | Balakrishnan | |
| 6,233,578 B1 | 5/2001 | Machihara et al. | |
| 6,246,981 B1 | 6/2001 | Papineni et al. | |
| 6,260,024 B1 | 7/2001 | Shkedy | |
| 6,266,637 B1 | 7/2001 | Donovan et al. | |
| 6,275,824 B1 | 8/2001 | O'Flaherty et al. | |
| 6,282,507 B1 | 8/2001 | Horiguchi et al. | |
| 6,285,786 B1 | 9/2001 | Seni et al. | |
| 6,308,149 B1 | 10/2001 | Gaussier et al. | |
| 6,311,189 B1 | 10/2001 | deVries et al. | |
| 6,317,594 B1 | 11/2001 | Gossman et al. | |
| 6,317,707 B1 | 11/2001 | Bangalore et al. | |
| 6,317,831 B1 | 11/2001 | King | |
| 6,321,092 B1 | 11/2001 | Fitch et al. | |
| 6,334,103 B1 | 12/2001 | Surace et al. | |
| 6,356,854 B1 | 3/2002 | Schubert et al. | |
| 6,356,905 B1 | 3/2002 | Gershman et al. | |
| 6,366,883 B1 | 4/2002 | Campbell et al. | |
| 6,366,884 B1 | 4/2002 | Belllegarda et al. | |
| 6,421,672 B1 | 7/2002 | McAllister et al. | |
| 6,434,524 B1 | 8/2002 | Weber | |
| 6,446,076 B1 | 9/2002 | Burkey et al. | |
| 6,449,620 B1 | 9/2002 | Draper et al. | |
| 6,453,281 B1 * | 9/2002 | Walters et al. | 704/200 |
| 6,453,292 B2 | 9/2002 | Ramaswamy et al. | |
| 6,460,029 B1 | 10/2002 | Fries et al. | |
| 6,466,654 B1 | 10/2002 | Cooper et al. | |
| 6,477,488 B1 | 11/2002 | Bellegarda | |
| 6,487,534 B1 | 11/2002 | Thelen et al. | |
| 6,499,013 B1 | 12/2002 | Weber | |
| 6,501,937 B1 | 12/2002 | Ho et al. | |
| 6,505,158 B1 | 1/2003 | Conkie | |
| 6,505,175 B1 | 1/2003 | Silverman et al. | |
| 6,505,183 B1 | 1/2003 | Loofbourrow et al. | |
| 6,510,417 B1 | 1/2003 | Woods et al. | |
| 6,513,063 B1 | 1/2003 | Julia et al. | |
| 6,523,061 B1 | 2/2003 | Halverson et al. | |
| 6,523,172 B1 | 2/2003 | Martinez-Guerra et al. | |
| 6,526,382 B1 | 2/2003 | Yuschik | |
| 6,526,395 B1 | 2/2003 | Morris | |
| 6,532,444 B1 | 3/2003 | Weber | |
| 6,532,446 B1 | 3/2003 | King | |
| 6,546,388 B1 | 4/2003 | Edlund et al. | |
| 6,553,344 B2 | 4/2003 | Bellegarda et al. | |
| 6,556,983 B1 | 4/2003 | Altschuler et al. | |
| 6,584,464 B1 | 6/2003 | Warthen | |
| 6,598,039 B1 | 7/2003 | Livowsky | |
| 6,601,026 B2 | 7/2003 | Appelt et al. | |
| 6,601,234 B1 | 7/2003 | Bowman-Amuah | |
| 6,604,059 B2 | 8/2003 | Strubbe et al. | |
| 6,615,172 B1 | 9/2003 | Bennett et al. | |
| 6,615,175 B1 | 9/2003 | Gazdzinski | |
| 6,615,220 B1 | 9/2003 | Austin et al. | |
| 6,625,583 B1 | 9/2003 | Silverman et al. | |
| 6,631,346 B1 | 10/2003 | Karaorman et al. | |
| 6,633,846 B1 | 10/2003 | Bennett et al. | |
| 6,647,260 B2 | 11/2003 | Dusse et al. | |
| 6,650,735 B2 | 11/2003 | Burton et al. | |
| 6,654,740 B2 | 11/2003 | Tokuda et al. | |
| 6,665,639 B2 | 12/2003 | Mozer et al. | |
| 6,665,640 B1 | 12/2003 | Bennett et al. | |
| 6,665,641 B1 | 12/2003 | Coorman et al. | |
| 6,680,675 B1 | 1/2004 | Suzuki | |
| 6,684,187 B1 | 1/2004 | Conkie | |
| 6,691,064 B2 | 2/2004 | Vroman | |
| 6,691,111 B2 | 2/2004 | Lazaridis et al. | |
| 6,691,151 B1 | 2/2004 | Cheyer et al. | |
| 6,697,780 B1 | 2/2004 | Beutnagel et al. | |
| 6,697,824 B1 | 2/2004 | Bowman-Amuah | |
| 6,701,294 B1 | 3/2004 | Ball et al. | |
| 6,711,585 B1 | 3/2004 | Copperman et al. | |
| 6,718,324 B2 | 4/2004 | Edlund et al. | |
| 6,721,728 B2 | 4/2004 | McGreevy | |
| 6,735,632 B1 | 5/2004 | Kiraly et al. | |
| 6,742,021 B1 | 5/2004 | Halverson et al. | |
| 6,757,362 B1 | 6/2004 | Cooper et al. | |
| 6,757,718 B1 | 6/2004 | Halverson et al. | |
| 6,766,320 B1 | 7/2004 | Want et al. | |

(56) References Cited

U.S. PATENT DOCUMENTS

| | | |
|---|---|---|
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,944,594 B2 * | 9/2005 | Busayapongchai ............... H04M 3/4936 704/270 |
| 6,957,076 B2 | 10/2005 | Hunzinger |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 * | 1/2006 | Packingham et al. ........ 704/275 |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,027,974 B1 | 4/2006 | Busch et al. |
| 7,036,128 B1 | 4/2006 | Julia et al. |
| 7,050,976 B1 * | 5/2006 | Packingham ............... 704/270 |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,084,758 B1 | 8/2006 | Cole |
| 7,092,887 B2 | 8/2006 | Mozer et al. |
| 7,092,928 B1 | 8/2006 | Elad et al. |
| 7,093,693 B1 | 8/2006 | Gazdzinski |
| 7,109,970 B1 * | 9/2006 | Miller .................. G06F 3/014 345/156 |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,292,579 B2 | 11/2007 | Morris |
| 7,299,033 B2 | 11/2007 | Kjellberg et al. |
| 7,302,686 B2 | 11/2007 | Togawa |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,528,713 B2 | 5/2009 | Singh et al. |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,543,232 B2 | 6/2009 | Easton, Jr. et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,571,106 B2 | 8/2009 | Cao et al. |
| 7,577,522 B2 | 8/2009 | Rosenberg |
| 7,599,918 B2 | 10/2009 | Shen et al. |
| 7,603,381 B2 | 10/2009 | Burke et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,649,454 B2 | 1/2010 | Singh et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,818,291 B2 | 10/2010 | Ferguson et al. |

(56) References Cited

U.S. PATENT DOCUMENTS

| | | |
|---|---|---|
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,873,519 B2 | 1/2011 | Bennett |
| 7,873,654 B2 | 1/2011 | Bernard |
| 7,881,936 B2 | 2/2011 | Longé et al. |
| 7,885,844 B1 | 2/2011 | Cohen et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,930,197 B2 | 4/2011 | Ozzie et al. |
| 7,949,529 B2 | 5/2011 | Weider et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 7,999,669 B2 | 8/2011 | Singh et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mazer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,138,912 B2 | 3/2012 | Singh et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,188,856 B2 | 5/2012 | Singh et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B2 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 8,694,322 B2 * | 4/2014 | Snitkovskiy ............ G06F 3/167 704/275 |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0055844 A1* | 5/2002 | L'Esperance et al. ....... 704/260 |
| 2002/0067308 A1 | 6/2002 | Robertson |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0154160 A1 | 10/2002 | Hosokawa |
| 2002/0163544 A1* | 11/2002 | Baker et al. .................. 345/835 |
| 2002/0164000 A1 | 11/2002 | Cohen et al. |
| 2002/0173299 A1* | 11/2002 | Buchholz .......... H04M 1/72522 455/418 |
| 2002/0198714 A1 | 12/2002 | Zhou |
| 2003/0013483 A1* | 1/2003 | Ausems et al. ............... 455/556 |
| 2003/0033151 A1* | 2/2003 | Vozick ................ A61B 5/7475 704/275 |
| 2003/0120494 A1 | 6/2003 | Jost et al. |
| 2003/0206199 A1 | 11/2003 | Pusa et al. |
| 2003/0212961 A1* | 11/2003 | Soin et al. .................... 715/530 |
| 2003/0233237 A1* | 12/2003 | Garside ................. G06F 3/038 704/270 |
| 2004/0030559 A1* | 2/2004 | Payne et al. .................. 704/275 |
| 2004/0054535 A1* | 3/2004 | Mackie et al. ................ 704/260 |
| 2004/0054539 A1* | 3/2004 | Simpson ................ G10L 15/30 704/270.1 |
| 2004/0054690 A1 | 3/2004 | Hillerbrand et al. |
| 2004/0135701 A1 | 7/2004 | Yasuda et al. |
| 2004/0162741 A1 | 8/2004 | Flaxer et al. |
| 2004/0193420 A1* | 9/2004 | Kennewick et al. ......... 704/257 |
| 2004/0236778 A1 | 11/2004 | Junqua et al. |
| 2004/0260438 A1* | 12/2004 | Chernetsky et al. ........... 701/36 |
| 2005/0015772 A1 | 1/2005 | Saare et al. |
| 2005/0021336 A1* | 1/2005 | Katsuranis .............. G06F 3/011 704/246 |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0108074 A1 | 5/2005 | Bloechl et al. |
| 2005/0114124 A1 | 5/2005 | Liu et al. |
| 2005/0114140 A1 | 5/2005 | Brackett et al. |
| 2005/0119897 A1 | 6/2005 | Bennett et al. |
| 2005/0125235 A1* | 6/2005 | Lazay et al. .................. 704/275 |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0288936 A1 | 12/2005 | Busayapongchai et al. |
| 2006/0018492 A1 | 1/2006 | Chiu et al. |
| 2006/0035632 A1* | 2/2006 | Sorvari et al. ................ 455/418 |
| 2006/0061488 A1 | 3/2006 | Dunton |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0111906 A1* | 5/2006 | Cross et al. .................. 704/257 |
| 2006/0117002 A1 | 6/2006 | Swen |
| 2006/0122834 A1 | 6/2006 | Bennett |
| 2006/0143007 A1 | 6/2006 | Koh et al. |
| 2006/0148520 A1* | 7/2006 | Baker et al. ................ 455/556.2 |
| 2006/0156252 A1 | 7/2006 | Sheshagiri et al. |
| 2007/0022178 A1 | 1/2007 | Lee et al. |
| 2007/0027732 A1 | 2/2007 | Hudgens |
| 2007/0050191 A1* | 3/2007 | Weider et al. ................ 704/275 |
| 2007/0055529 A1 | 3/2007 | Kanevsky et al. |
| 2007/0088556 A1* | 4/2007 | Andrew ................ G10L 15/19 704/270.1 |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0124149 A1* | 5/2007 | Shen et al. .................... 704/275 |
| 2007/0135949 A1 | 6/2007 | Snover et al. |
| 2007/0174188 A1 | 7/2007 | Fish |
| 2007/0185754 A1 | 8/2007 | Schmidt |
| 2007/0185917 A1 | 8/2007 | Prahlad et al. |
| 2007/0208726 A1 | 9/2007 | Krishnaprasad et al. |
| 2007/0276714 A1 | 11/2007 | Beringer |
| 2007/0276810 A1 | 11/2007 | Rosen |

(56) References Cited

U.S. PATENT DOCUMENTS

| | | |
|---|---|---|
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0071544 A1 | 3/2008 | Beaufays et al. |
| 2008/0079566 A1 | 4/2008 | Singh et al. |
| 2008/0082390 A1 | 4/2008 | Hawkins et al. |
| 2008/0082651 A1 | 4/2008 | Singh et al. |
| 2008/0104541 A1 | 5/2008 | McDonald et al. |
| 2008/0120112 A1 | 5/2008 | Jordan et al. |
| 2008/0122796 A1* | 5/2008 | Jobs et al. ............... 345/173 |
| 2008/0129520 A1 | 6/2008 | Lee |
| 2008/0140657 A1 | 6/2008 | Azvine et al. |
| 2008/0189110 A1 | 8/2008 | Freeman et al. |
| 2008/0189360 A1 | 8/2008 | Kiley et al. |
| 2008/0201306 A1* | 8/2008 | Cooper et al. ............... 707/3 |
| 2008/0221880 A1* | 9/2008 | Cerra et al. ............... 704/235 |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0300886 A1* | 12/2008 | Patch ............... 704/275 |
| 2008/0313335 A1 | 12/2008 | Jung et al. |
| 2008/0319763 A1 | 12/2008 | Di Fabbrizio et al. |
| 2009/0006099 A1* | 1/2009 | Sharpe et al. ............... 704/275 |
| 2009/0006100 A1* | 1/2009 | Badger et al. ............... 704/275 |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0094033 A1* | 4/2009 | Mozer et al. ............... 704/251 |
| 2009/0100049 A1 | 4/2009 | Cao |
| 2009/0112572 A1* | 4/2009 | Thorn ............... 704/3 |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0191895 A1 | 7/2009 | Singh et al. |
| 2009/0239552 A1 | 9/2009 | Churchill et al. |
| 2009/0253463 A1* | 10/2009 | Shin et al. ............... 455/563 |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0306980 A1* | 12/2009 | Shin ............... 704/235 |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0145700 A1 | 1/2010 | Kennewick et al. |
| 2010/0036660 A1 | 2/2010 | Bennett |
| 2010/0042400 A1 | 2/2010 | Block et al. |
| 2010/0081456 A1 | 4/2010 | Singh et al. |
| 2010/0088020 A1 | 4/2010 | Sano et al. |
| 2010/0138215 A1 | 6/2010 | Williams |
| 2010/0146442 A1 | 6/2010 | Nagasaka et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0235793 A1 | 9/2010 | Ording et al. |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0195758 A1 | 8/2011 | Damale et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0260861 A1 | 10/2011 | Singh et al. |
| 2011/0264643 A1 | 10/2011 | Cao |
| 2011/0279368 A1 | 11/2011 | Klein et al. |
| 2011/0306426 A1 | 12/2011 | Novak et al. |
| 2011/0314404 A1 | 12/2011 | Kotler et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0149394 A1 | 6/2012 | Singh et al. |
| 2012/0173464 A1 | 7/2012 | Tur et al. |
| 2012/0214517 A1 | 8/2012 | Singh et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |
| 2019/0189125 A1 | 6/2019 | Van Os et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003517158 A | 5/2003 |

(56) References Cited

FOREIGN PATENT DOCUMENTS

| | | |
|---|---|---|
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| TW | 200638337 A | 11/2006 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 2000/60435 | 10/2000 |
| WO | WO 2000/60435 A3 | 10/2000 |
| WO | WO 02/073603 A1 | 9/2002 |
| WO | WO 2006/129967 A1 | 12/2006 |
| WO | WO 2007080559 A2 * | 7/2007 |
| WO | WO 2008/085742 A2 | 7/2008 |
| WO | WO 2008/109835 A2 | 9/2008 |
| WO | WO2008109835 A2 | 9/2008 |
| WO | WO 2011/088053 A2 | 7/2011 |
| WO | WO 2012/167168 A2 | 12/2012 |

OTHER PUBLICATIONS

Authorized Officer Régis Quélavoine, Notification of Transmittal of the International Search Report and the Written Opinion of the International Searching Authority, or the Declaration for Application No. PCT/US2010/037378, dated Aug. 25, 2010, 16 pages.

Erin Keleher and Beth Monaghan, "vlingo, Vlingo Launches Voice Enablement Application on Apple App Store," Vlingo for iPhone Allows Users to Search the Web, Use Google Maps, Dial Phone Number and Update their Facebook and Twitter Accounts All by Speaking into the Device, Cambridge, Mass, Dec. 3, 2008, 2 pages.

Combined Search and Examination Report under Sections 17 and 18(3) for GB Application No. 1009318.5 dated Oct. 8, 2010, 5 pages.

Alfred App, 2011, http://www.alfredapp.com/, 5 pages.

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

(56) References Cited

OTHER PUBLICATIONS

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., "Interactive Acquisition of Justifications: Learning "Why" by Being Told What" Knowledge Systems Laboratory, Stanford University, Oct. 1990, Technical Report KSL 91-17, Revised Feb. 1991, 24 pages.
Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.
Gruber, T. R., et al.,"NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Medical, http://lsro.epfl.ch/page-68384-en.html, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration, Talk and Look: Tools for Ambient Linguistic Knowledge," Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.

(56) References Cited

OTHER PUBLICATIONS

Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube, "Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube, "Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
Car Working Group, "Bluetooth Doc Hands-Free Profile 1.5 HFP1.5_SPEC," Nov. 25, 2005, www.bluetooth.org, 84 pages.
Cohen, Michael H., et al., "Voice User Interface Design," excerpts from Chapter 1 and Chapter 10, Addison-Wesley ISBN:0-321-18576-5, 2004, 36 pages.
Gong, J., et al., "Guidelines for Handheld Mobile Device Interface Design," Proceedings of DSI 2004 Annual Meeting, pp. 3751-3756.
Horvitz, E., "Handsfree Decision Support: Toward a Non-invasive Human-Computer Interface," Proceedings of the Symposium on Computer Applications in Medical Care, IEEE Computer Society Press, Nov. 1995, 1 page.
Horvitz, E., "In Pursuit of Effective Handsfree Decision Support: Coupling Bayesian Inference, Speech Understanding, and User Models," 1995, 8 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
"Top 10 Best Practices for Voice User Interface Design," Nov. 1, 2002, http://www.developer.com/voice/article.php/1567051/Top-10-Best-Practices-for-Voice-User-Interface-Design.htm, 4 pages.
Australian Office Action dated Nov. 13, 2012 for Application No. 2011205426, 7 pages.
Australian Office Action dated Oct. 31, 2012 for Application No. 2012101191, 6 pages.
Current claims of PCT Application No. PCT/US11/20861 dated Jan. 11, 2011, 17 pages.
EP Communication under Rule-161(2) and 162 EPC for Application No. 117079392.2-2201, 4 pages.
Office Action dated Mar. 14, 2013, received in U.S. Appl. No. 12/987,982, 59 pages (Gruber).
Office Action dated Jan. 31, 2013, received in U.S. Appl. No. 13/251,088, 38 pages (Gruber).
Office Action dated Nov. 28, 2012, received in U.S. Appl. No. 13/251,104, 49 pages (Gruber).
Office Action dated Dec. 7, 2012, received in U.S. Appl. No. 13/251,118, 52 pages (Gruber).
Final Office Action dated Mar. 25, 2013, received in U.S. Appl. No. 13/251,127, 53 pages (Gruber).

Office Action dated Nov. 8, 2012, received in U.S. Appl. No. 13/251,127, 35 pages (Gruber).
GB Patent Act 1977: Combined Search Report and Examination Report under Sections 17 and 18(3) for Application No. GB1009318.5, report dated Oct. 8, 2010, 5 pages.
GB Patent Act 1977: Combined Search Report and Examination Report under Sections 17 and 18(3) for Application No. GB1217449.6, report dated Jan. 17, 2013, 6 pages.
International Search Report and Written Opinion dated Aug. 25, 2010, received in International Application No. PCT/US2010/037378, which corresponds to U.S. Appl. No. 12/479,477, 16 pages (Apple Inc.).
International Search Report and Written Opinion dated Nov. 29, 2011, received in International Application No. PCT/US2011/20861, which corresponds to U.S. Appl. No. 12/987,982, 15 pages. (Thomas Robert Gruber).
International Search Report and Written Opinion dated Nov. 16, 2012, received in International Application No. PCT/US2012/040571, which corresponds to U.S. Appl. No. 13/251,088 14 pages (Apple Inc.).
International Search Report and Written Opinion dated Dec. 20, 2012, received in International Application No. PCT/US2012/056382, which corresponds to U.S. Appl. No. 13/250,947, 11 pages (Gruber).
Bussler, C., et al., "Web Service Execution Environment (WSMX)," Jun. 3, 2005, W3C Member Submission, http://www.w3.org/Submission/WSMX, 29 pages.
Cheyer, A., "About Adam Cheyer," Sep. 17, 2012, http://www.adam.cheyer.com/about.html, 2 pages.
Cheyer, A., "A Perspective on Al & Agent Technologies for SCM," VerticalNet, 2001 presentation, 22 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Roddy, D., et al., "Communication and Collaboration in a Landscape of B2B eMarketplaces," VerticalNet Solutions, white paper, Jun. 15, 2000, 23 pages.
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by the Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.

(56) References Cited

OTHER PUBLICATIONS

Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom.2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 Pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics," 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "Team: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.

(56) References Cited

OTHER PUBLICATIONS

Guzzoni, D., et al., "Active, A platform for Building Intelligent Software," Computational Intelligence 2006, 5 pages. http://www.informatik.uni-trier.de/~ley/pers/hd/g/Guzzoni:Didier.

Guzzoni, D., "Active: A unified platform for building intelligent assistant applications," Oct. 25, 2007, 262 pages.

Guzzoni, D., et al., "Many Robots Make Short Work," 1996 AAAI Robot Contest, SRI International, 9 pages.

Haas, N., et al., "An Approach to Acquiring and Applying Knowledge," Nov. 1980, SRI International, 22 pages.

Hadidi, R., et al., "Students' Acceptance of Web-Based Course Offerings: An Empirical Assessment," 1998 Proceedings of the Americas Conference on Information Systems (AMCIS), 4 pages.

Hawkins, J., et al., "Hierarchical Temporal Memory: Concepts, Theory, and Terminology," Mar. 27, 2007, Numenta, Inc., 20 pages.

He, Q., et al., "Personal Security Agent: KQML-Based PKI," The Robotics Institute, Carnegie-Mellon University, paper, Oct. 1, 1997, 14 pages.

Hendrix, G. et al., "Developing a Natural Language Interface to Complex Data," ACM Transactions on Database Systems, vol. 3, No. 2, Jun. 1978, 43 pages.

Hendrix, G., "Human Engineering for Applied Natural Language Processing," Feb. 1977, SRI International, 27 pages.

Hendrix, G., "Klaus: A System for Managing Information and Computational Resources," Oct. 1980, SRI International, 34 pages.

Hendrix, G., "Lifer: A Natural Language Interface Facility," Dec. 1976, SRI Stanford Research Institute, Artificial Intelligence Center, 9 pages.

Hendrix, G., "Natural-Language Interface," Apr.-Jun. 1982, American Journal of Computational Linguistics, vol. 8, No. 2, 7 pages.

Hendrix, G., "The Lifer Manual: A Guide to Building Practical Natural Language Interfaces," Feb. 1977, SRI International, 76 pages.

Hendrix, G., et al., "Transportable Natural-Language Interfaces to Databases," Apr. 30, 1981, SRI International, 18 pages.

Hirschman, L., et al., "Multi-Site Data Collection and Evaluation in Spoken Language Understanding," 1993, Proceedings of the workshop on Human Language Technology, 6 pages.

Hobbs, J., et al., "Fastus: A System for Extracting Information from Natural-Language Text," Nov. 19, 1992, SRI International, Artificial Intelligence Center, 26 pages.

Hobbs, J., et al.,"Fastus: Extracting Information from Natural-Language Texts," 1992, SRI International, Artificial Intelligence Center, 22 pages.

Hobbs, J., "Sublanguage and Knowledge," Jun. 1984, SRI International, Artificial Intelligence Center, 30 pages.

Hodjat, B., et al., "Iterative Statistical Language Model Generation for Use with an Agent-Oriented Natural Language Interface," vol. 4 of the Proceedings of HCI International 2003, 7 pages.

Huang, X., et al., "The SPHINX-II Speech Recognition System: An Overview," Jan. 15, 1992, Computer, Speech and Language, 14 pages.

Issar, S., et al., "CMU's Robust Spoken Language Understanding System," 1993, Proceedings of EUROSPEECH, 4 pages.

Issar, S., "Estimation of Language Models for New Spoken Language Applications," Oct. 3-6, 1996, Proceedings of 4th International Conference on Spoken language Processing, Philadelphia, 4 pages.

Janas, J., "The Semantics-Based Natural Language Interface to Relational Databases," © Springer-Verlag Berlin Heidelberg 1986, Germany, 48 pages.

Johnson, J., "A Data Management Strategy for Transportable Natural Language Interfaces," Jun. 1989, doctoral thesis submitted to the Department of Computer Science, University of British Columbia, Canada, 285 pages.

Julia, L., et al., "http://www.speech.sri.com/demos/atis.html," 1997, Proceedings of AAAI, Spring Symposium, 5 pages.

Kahn, M., et al., "CoABS Grid Scalability Experiments," 2003, Autonomous Agents and Multi-Agent Systems, vol. 7, 8 pages.

Kamel, M., et al., "A Graph Based Knowledge Retrieval System," © 1990 IEEE, 7 pages.

Katz, B., "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Kats, B., et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "REXTOR: A System for Generating Relations from Natural Language," In Proceedings of the ACL Oct. 2000 Workshop on Natural Language Processing and Information Retrieval (NLP &IR), 11 pages.

Katz, B., "Using English for Indexing and Retrieving," 1988 Proceedings of the 1st RIAO Conference on User-Oriented Content-Based Text and Image (RIAO'88), 19 pages.

Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.

Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages.

Milstead, J., et al., "Metadata: Cataloging by Any Other Name . . . " Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

(56) References Cited

OTHER PUBLICATIONS

Moore, R., et al., "SRI's Experience with the ATIS Evaluation," Jun. 24-27, 1990, Proceedings of a workshop held at Hidden Valley, Pennsylvania, 4 pages.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., et al., "Adapting the Core Language Engine to French and Spanish," May 10, 1996, Cornell University Library, 9 pages. http://arxiv.org/abs/cmp-Ig/9605015.

Rayner, M., "Abductive Equivalential Translation and its application to Natural Language Database Interfacing," Sep. 1993 Dissertation paper, SRI International, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.

Roddy, D., et al., "Communication and Collaboration in a Landscape of B2B eMarketplaces," VerticalNet Solutions, white paper, Jun. 15, 2000, 24 pages.

Rudnicky, A.I., et al., "Creating Natural Dialogs in the Carnegie Mellon Communicator System,".

Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.

Sagalowicz, D., "A D-Ladder User's Guide," Sep. 1980, SRI International, 42 pages.

Sameshima, Y., et al., "Authorization with security attributes and privilege delegation Access control beyond the ACL," Computer Communications, vol. 20, 1997, 9 pages.

San-Segundo, R., et al., "Confidence Measures for Dialogue Management in the CU Communicator System," Jun. 5-9, 2000, Proceedings of Acoustics, Speech, and Signal Processing (ICASSP'00), 4 pages.

Sato, H., "A Data Model, Knowledge Base, and Natural Language Processing for Sharing a Large Statistical Database," 1989, Statistical and Scientific Database Management, Lecture Notes in Computer Science, vol. 339, 20 pages.

Schnelle, D., "Context Aware Voice User Interfaces for Workflow Support," Aug. 27, 2007, Dissertation paper, 254 pages.

Sharoff, S., et al., "Register-domain Separation as a Methodology for Development of Natural Language Interfaces to Databases," 1999, Proceedings of Human-Computer Interaction (INTERACT'99), 7 pages.

Shimazu, H., et al., "CAPIT: Natural Language Interface Design Tool with Keyword Analyzer and Case-Based Parser," NEC Research & Development, vol. 33, No. 4, Oct. 1992, 11 pages.

Shinkle, L., "Team User's Guide," Nov. 1984, SRI International, Artificial Intelligence Center, 78 pages.

Shklar, L., et al., "Info Harness: Use of Automatically Generated Metadata for Search and Retrieval of Heterogeneous Information," 1995 Proceedings of CAiSE'95, Finland.

Singh, N., "Unifying Heterogeneous Information Models," 1998 Communications of the ACM, 13 pages.

SRI2009, "SRI Speech: Products: Software Development Kits: EduSpeak," 2009, 2 pages, available at http://web.archive.org/web/20090828084033/http://www.speechatsri.com/products/eduspeak.shtml.

Starr, B., et al., "Knowledge-Intensive Query Processing," May 31, 1998, Proceedings of the 5th KRDB Workshop, Seattle, 6 pages.

Stern, R., et al. "Multiple Approaches to Robust Speech Recognition," 1992, Proceedings of Speech and Natural Language Workshop, 6 pages.

Sycara, K., et al., "The RETSINA MAS Infrastructure," 2003, Autonomous Agents and Multi-Agent Systems, vol. 7, 20 pages.

Stickel, "A Nonclausal Connection-Graph Resolution Theorem-Proving Program," 1982, Proceedings of AAAI'82, 5 pages.

Sugumaran, V., "A Distributed Intelligent Agent-Based Spatial Decision Support System," Dec. 31, 1998, Proceedings of the Americas Conference on Information systems (AMCIS), 4 pages.

Sycara, K., et al., "Coordination of Multiple Intelligent Software Agents," International Journal of Cooperative Information Systems (IJCIS), vol. 5, Nos. 2 & 3, Jun. & Sep. 1996, 33 pages.

Sycara, K., et al., "Distributed Intelligent Agents," IEEE Expert, vol. 11, No. 6, Dec. 1996, 32 pages.

Sycara, K., et al., "Dynamic Service Matchmaking Among Agents in Open Information Environments ," 1999, SIGMOD Record, 7 pages.

Tyson, M., et al., "Domain-Independent Task Specification in the TACITUS Natural Language System," May 1990, SRI International, Artificial Intelligence Center, 16 pages.

Wahlster, W., et al., "Smartkom: multimodal communication with a life-like character," 2001 EUROSPEECH—Scandinavia, 7th European Conference on Speech Communication and Technology, 5 pages.

Waldinger, R., et al., "Deductive Question Answering from Multiple Resources," 2003, New Directions in Question Answering, published by AAAI, Menlo Park, 22 pages.

Walker, D., et al., "Natural Language Access to Medical Text," Mar. 1981, SRI International, Artificial Intelligence Center, 23 pages.

Waltz, D., "An English Language Question Answering System for a Large Relational Database," © 1978 ACM, vol. 21, No. 7, 14 pages.

(56) References Cited

OTHER PUBLICATIONS

Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Australian Office Action dated Dec. 7, 2012 for Application No. 2010254812, 8 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Phoenix Solutions, Inc. v. West Interactive Corp., Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, © 1994 IEEE, 9 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing(ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A

(56) References Cited

OTHER PUBLICATIONS

Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges,15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings Tencon '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties, dspGuro, Digital Signal Processing Central," http://www.dspouru.com/dsp/taos/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.

(56) References Cited

OTHER PUBLICATIONS

Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)-An Improved Single-Chip Real-Time Mandarin Dictation Machine for Chinese Language with Very Large Vocabulary," 0-7803-0946-4/93 © 1993IEEE, 4 pages.
Lee, L, et al., "Golden Mandarin(II)-An Intelligent Mandarin Dictation Machine for Chinese Character Input with Adaptation/ Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-HARPY Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.
Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/ downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.

(56) References Cited

OTHER PUBLICATIONS

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schutze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat . . . & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
Australian Office Action dated Nov. 27, 2012 for Application No. 2012101471, 6 pages.
Australian Office Action dated Nov. 22, 2012 for Application No. 2012101466, 6 pages.
Australian Office Action dated Nov. 14, 2012 for Application No. 2012101473, 6 pages.
Australian Office Action dated Nov. 19, 2012 for Application No. 2012101470, 5 pages.
Australian Office Action dated Nov. 28, 2012 for Application No. 2012101468, 5 pages.
Australian Office Action dated Nov. 19, 2012 for Application No. 2012101472, 5 pages.
Australian Office Action dated Nov. 19, 2012 for Application No. 2012101469, 6 pages.
Australian Office Action dated Nov. 15, 2012 for Application No. 2012101465, 6 pages.
Australian Office Action dated Nov. 30, 2012 for Application No. 2012101467, 6 pages.
Canadian Office Action dated Mar. 27, 2013 for Application No. 2,793,118, 3 pages.
Notice of Allowance dated Feb. 29, 2012, received in U.S. Appl. No. 11/518,292, 29 pages (Cheyer).
Final Office Action dated May 10, 2011, received in U.S. Appl. No. 11/518,292, 14 pages (Cheyer).
Office Action dated Nov. 24, 2010, received in U.S. Appl. No. 11/518,292, 12 pages (Cheyer).
Office Action dated Nov. 9, 2009, received in U.S. Appl. No. 11/518,292, 10 pages (Cheyer).
Office Action dated Mar. 27, 2013, received in U.S. Appl. No. 13/725,656, 22 pages (Gruber).
Office Action dated Apr. 16, 2013, received in U.S. Appl. No. 13/725,550, 8 pages (Cheyer).
Russian Office Action dated Nov. 8, 2012 for Application No. 2012144647, 7 pages.
Russian Office Action dated Dec. 6, 2012 for Application No. 2012144605, 6 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages. (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).

(56) References Cited

OTHER PUBLICATIONS

Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
International Preliminary Report on Patentability received for PCT Patent Application No. PCT/US2010/037378, dated Dec. 15, 2011, 9 pages.
Notice of Acceptance received for Australian Patent Application No. 2014221287, dated Jul. 1, 2016, 2 pages.
Notice of Allowance received for Taiwanese Patent Application No. 099118245, dated Aug. 13, 2015, 4 pages (2 pages of English Translation and 2 pages of Official Copy).
Office Action received for Australian Patent Application No. 2010254812, dated Aug. 27, 2014, 4 pages.
Office Action received for Australian Patent Application No. 2010254812, dated Sep. 8, 2014, 4 pages.
Office Action received for Australian Patent Application No. 2014221287, dated Jul. 2, 2015, 3 pages.
Office Action received for Australian Patent Application No. 2014221287, dated May 26, 2016, 4 pages.
Office Action received for Australian Patent Application No. 2016244329, dated Aug. 21, 2018, 6 pages.
Office Action received for Australian Patent Application No. 2016244329, dated Oct. 20, 2017, 3 pages.
Office Action received for Indian Patent Application No. 1546/CHE/2010, dated May 3, 2018, 6 pages.
Office Action received for Taiwanese Patent Application No. 099118245, dated Dec. 4, 2014, 17 pages (7 pages of English Translation and 10 pages of Official Copy).
Non-Final Office Action received for U.S. Appl. No. 16/273,924, dated May 31, 2019, 20 pages.

* cited by examiner

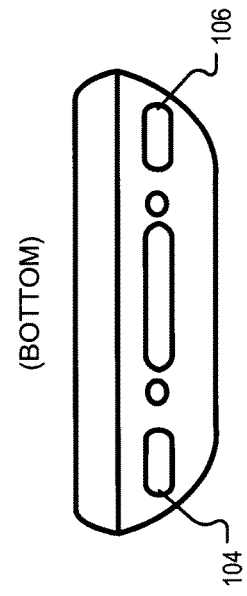
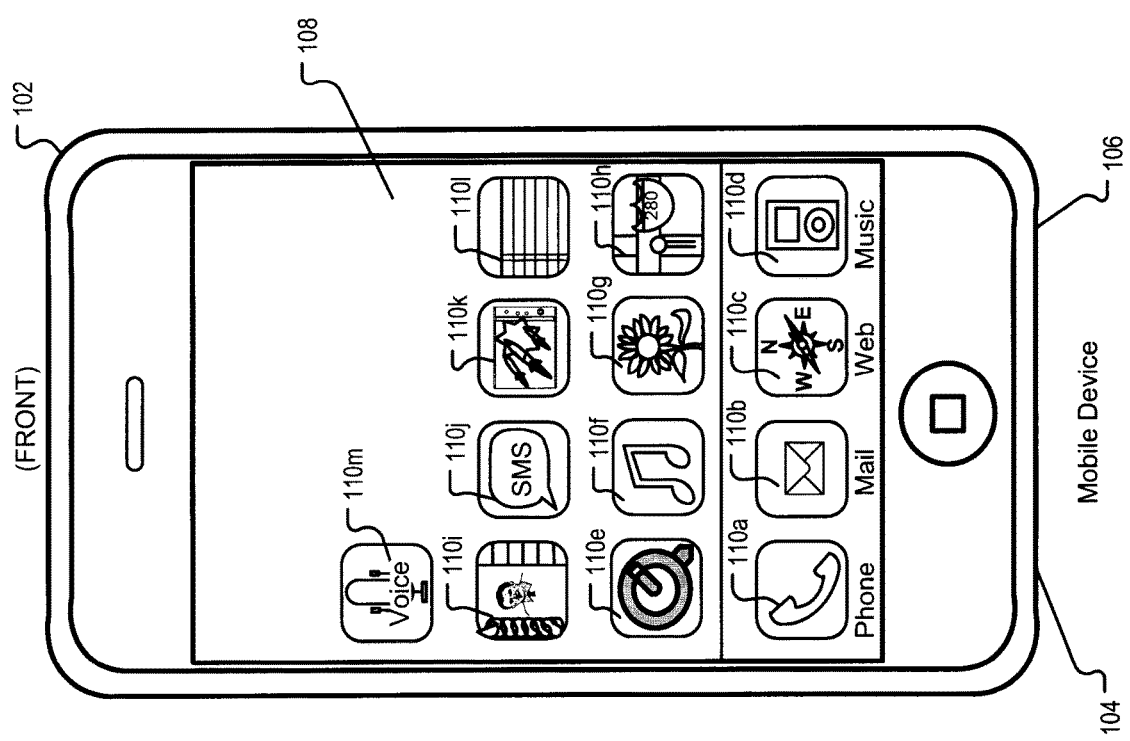

Mobile Device voice command activated

Mobile Device before activating voice command

CONTEXTUAL VOICE COMMANDS

TECHNICAL FIELD

This application relates to speech recognition.

BACKGROUND

Speech recognition can be used to convert spoken words to machine-readable input, such as key presses, using the binary code for a string of character codes. Typical speech recognition applications include voice dialing, call routing, domotic appliance control, simple data entry and speech-to-text processing. In these applications, speech can be used as a part of a user interface to create pre-defined speech or voice commands.

SUMMARY

A combination of physical and voice inputs can be used to implement contextual voice commands that control device operations across different contexts (e.g., applications) on a device, such as a smart phone. In addition, by using contextual voice commands, a user can execute desired operations faster than by navigating through a set of nested menu items. Also, contextual voice commands can be used to teach the device to accurately predict the intent of the user from a single voice command. Further, contextual voice commands can be used to vary the manner in which the user provides the voice input based on the context of the device being used.

BRIEF DESCRIPTION OF THE DRAWINGS

FIGS. 1a and 1b show front and bottom views of a device for performing contextual voice commands in an embodiment.

Like reference symbols and designations in the various drawings indicate like elements.

DETAILED DESCRIPTION

Figure 2B:
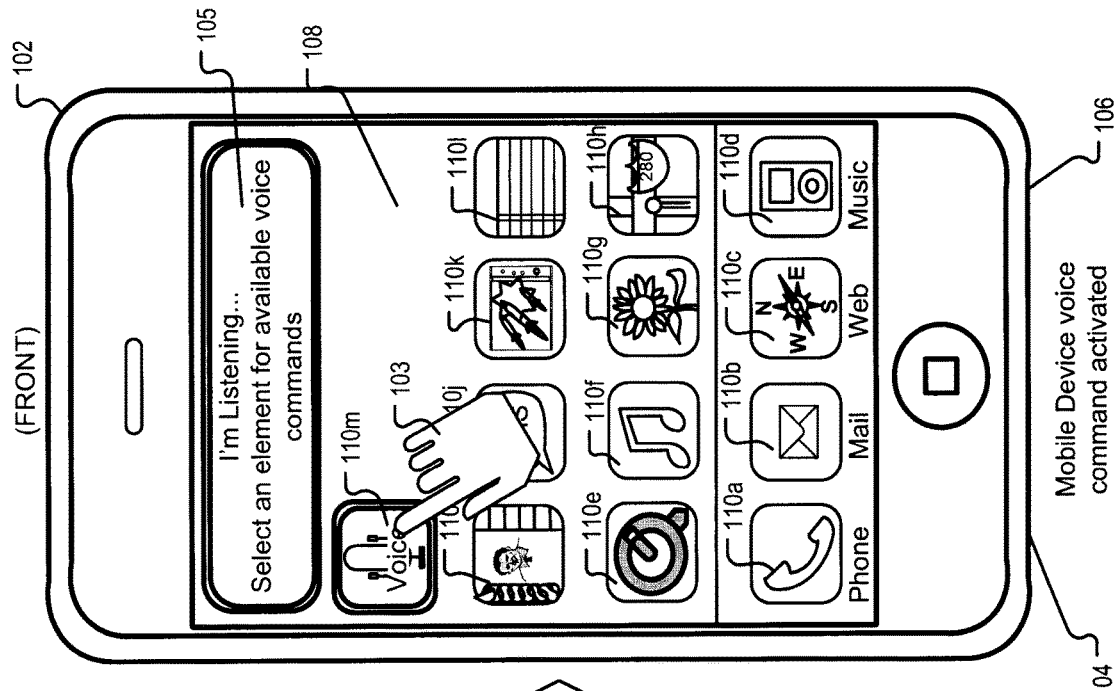
FIGS. 2a and 2b illustrate activation of contextual voice commands for a data processing device in an embodiment.

FIGS. 1a and 1b show front and bottom views of a device 102 for performing contextual voice commands to operate the device. The data processing device 102 can be any device, such as a mobile device, with the ability to receive voice and physical inputs and perform operations in one or more applications or contexts based on the received voice and physical inputs. The data processing device 102 includes communication technology (e.g., wireless technology) for sharing information with other devices. The data processing device 102 can include a variety of integrated user interface units or can be coupled to user interface units through one or more communication ports or data links of the device. Some examples of the user interface units include but are not limited to a voice input unit, such as a microphone 106. Some examples of the user interface units include but are not limited to physical input units, such a keyboard, a mouse, a track ball, a rotary dial or wheel, a touchpad, or a touch-screen. Some examples of the user interface units include but are not limited to motion sensors, such as an accelerometer, magnetometer, or a gyroscope. Any of these user interface units can be implemented as an external unit that communicates with the data processing device 102 to provide user input using a wired or wireless communication technology. Examples of wired communication technology include Universal Serial Bus (USB) interface, FireWire interface, etc. Examples of wireless communication technology include Bluetooth, Wi-Fi, WiMax, infrared, etc. Through these user interface units, the data processing device 102 can receive physical or voice inputs from the user.

The data processing device 102 includes output units to present visual and audio information to a user. Some examples of the output units include but are not limited to a display unit 108 and a speaker 104. FIGS. 1a and 1b show the data processing device 102 as a mobile device for illustrative purposes, but the data processing device 102 can include other types of devices such as a mobile phone a personal digital assistant, a portable computer, and a desktop computer.

The disclosed voice commands are contextual in that inputs, in addition to voice, that indicate different levels or types of context for the commands are considered. The contextual inputs considered can include the particular activity being performed at a particular time, a particular portion of the activity selected, or voice commands in such context. For example, contextual voice commands can be implemented in the context of the activity that a user is performing on a data processing device, such as using a particular application. For example, FIG. 1a shows data items, such as icons displayed on the display unit 108 of the data processing device 102. Each icon represents a corresponding application available to be performed on the data processing device 102. Some examples of the available icons and associated applications include but are not limited to: a phone application icon 110a, an email application icon 110b, a Web browser application icon 110c, a music player application icon 110d, a media player application icon 110e, a music download application icon 110f, an image processing application icon 110g, a geopositioning (e.g., GPS, Wi-Fi based positioning, cellular triangulation) application icon 110h, a contacts application icon 110i, a short message service (SMS) application icon 110j, a video game application icon 110k, and a text processing application 110l icon. Also, the available applications can be presented to the user using audible data items, such as recorded sounds associated with the available applications. The recorded sounds can be user recognizable speech, such as the names of the applications or simple sounds, such as a beep, a tone, a chime, etc.

Thus, contextual voice commands can be more precise than conventional voice commands that merely control the device as a whole. For example, different context specific voice commands can be implemented based on user activity or application in use. In addition, the scope of the context can extend to specific portions of user activity or an application, such as particular areas of a user interface. In such manner, the contextual voice commands can selectively provide voice navigation of a user interface for a selected portion of the user activity or application.

Each of these applications can be in communication with a contextual voice command controller or module that controls operation of the applications based on received user input. The contextual voice command module can control the operation of the applications by activating a contextual voice command mode on the data processing device. To control the applications, the contextual voice command controller or module can be implemented as a plug-in for the other applications. In other implementations, the data processing device can include an Application Programming Interface (API) which allows a contextual voice command module to access libraries and utilities provided by an operating system or other native application. The contextual voice command module can communicate with an input unit (e.g., voice and/or physical input units) to receive user input used to control the rest of the applications.

An audio input unit can include user interface units that receive audio inputs, such as a microphone 106. As described above, the audio input unit can be either a built-in unit or an external unit. The user can speak into the microphone 106 to provide voice inputs that can be translated into contextual voice commands using speech recognition technology (e.g., technologies based on Hidden Markov Models, dynamic time warping, etc.) Speech recognition software or technology can be used to recognize voice commands in speech, such as commercially available products or open source products such as Open Mind Speech, VoxForge, Julius, etc. among others.

A physical input unit (e.g., a touch screen, mouse, touchpad, etc.) can be used to receive physical inputs, such as positional information with respect to a visual screen displayed on an output unit (e.g., an output unit 108) of the data processing device 102. Some physical input units, (e.g., a button) can be used to receive non-positional information, such as user selection or confirmation. For example, the user can use a mouse to execute various point-and-click functions on the displayed screen. Also, a user can use a touch screen to perform the same functions on the displayed screen. Some user interface units, such as the keyboard, can provide textual inputs in addition to physical inputs.

Figure 2A:
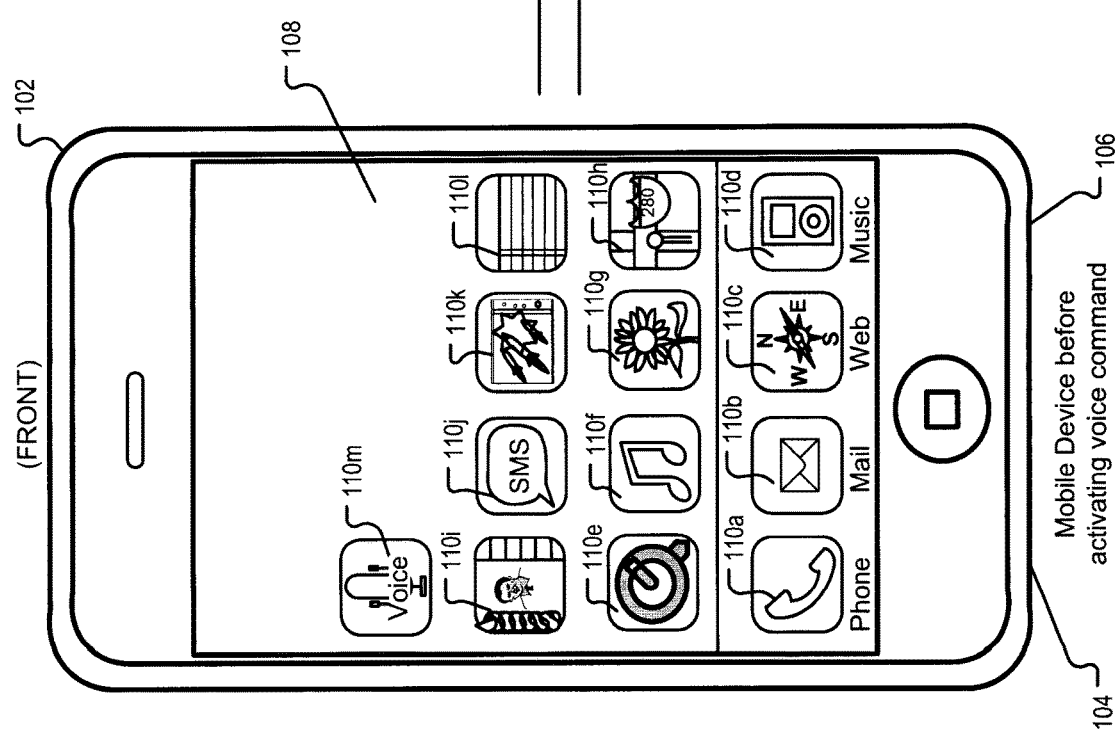

FIGS. 2a and 2b illustrate activation of a contextual voice command mode on a data processing device 102. FIG. 2a shows a front view of a data processing device 102 before the contextual voice command mode is activated. The user can activate the contextual voice command mode and place the data processing device 102 in a listening mode by interacting with a hardware button or virtual user interface element, such as the contextual voice command icon 110m. In addition, the contextual voice command mode can be implemented to present to the user a complete voice control service that includes contextual and non-contextual options. Thus, the term "contextual voice command mode" is applied in this specification to include but not limited to contextual voice commands.

FIG. 2b shows a front view of a data processing device 102 with the contextual voice command mode activated. In the example shown in FIG. 2b, the user touches and selects the contextual voice command icon 110m using his finger 103, for example. User selection of the data item or element (e.g., contextual voice command icon 110m) displayed on the display unit 108 can be communicated to the user using a visual indication, such as a bolded border, a colored glow, a highlight, different color, etc. Also, an audio indication can be used in addition to, or in place of, the visual indication. For example, an audible, "contextual voice command active" or "I'm listening" can be played through a speaker for the user to hear. In some implementations, the audio indication presented to the user can include prompting tones played instead of, or in addition to, the recognizable speech.

Once the contextual voice command mode is active, the data processing device 102 can generate additional visual and/or audio indications to present a choice of contextual voice commands to the user. For example, a portion of the display 108 can be used to present a visual indication (e.g., a status bar 105) to the user. In the example shown in FIG. 2b, the status bar 105 is used to display various text that indicate to the user that the device is listening for contextual voice commands from the user and that the user can select an element (e.g., an application) to receive a list of available contextual voice command for the selected element. The device can provide the choice of contextual voice commands and/or instructions to the user using audible and visual indications.

Figure 3A:
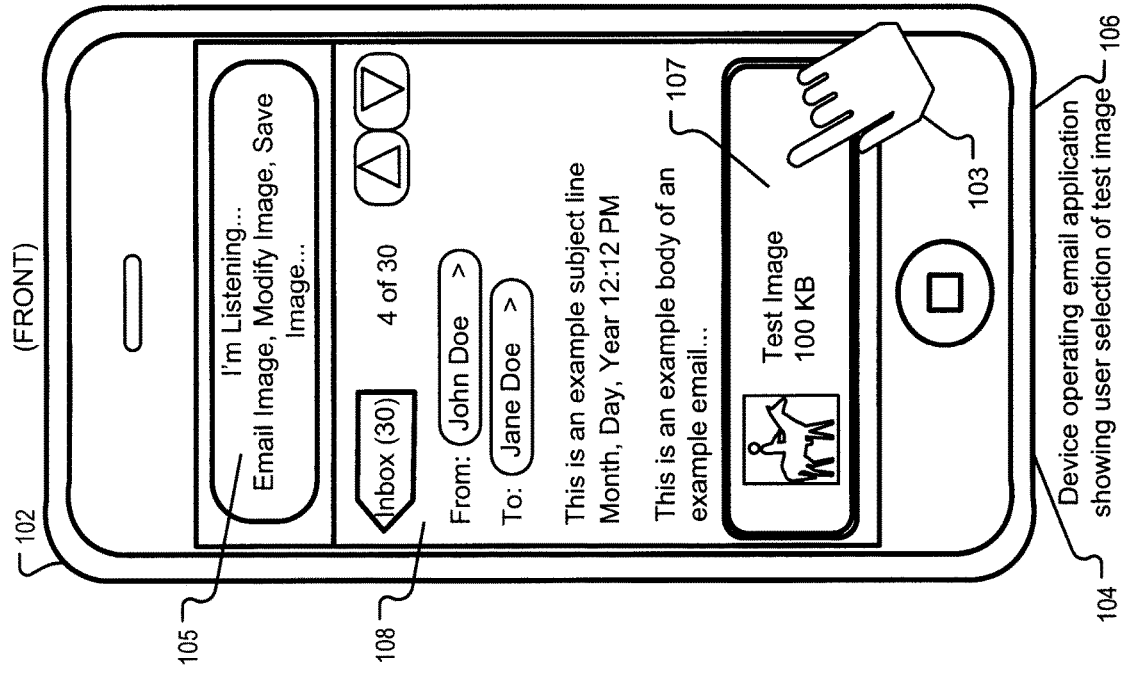
FIGS. 3a and 3b show front views of a data processing device that illustrate usage of contextual voice commands in an embodiment.
Figure 3B:
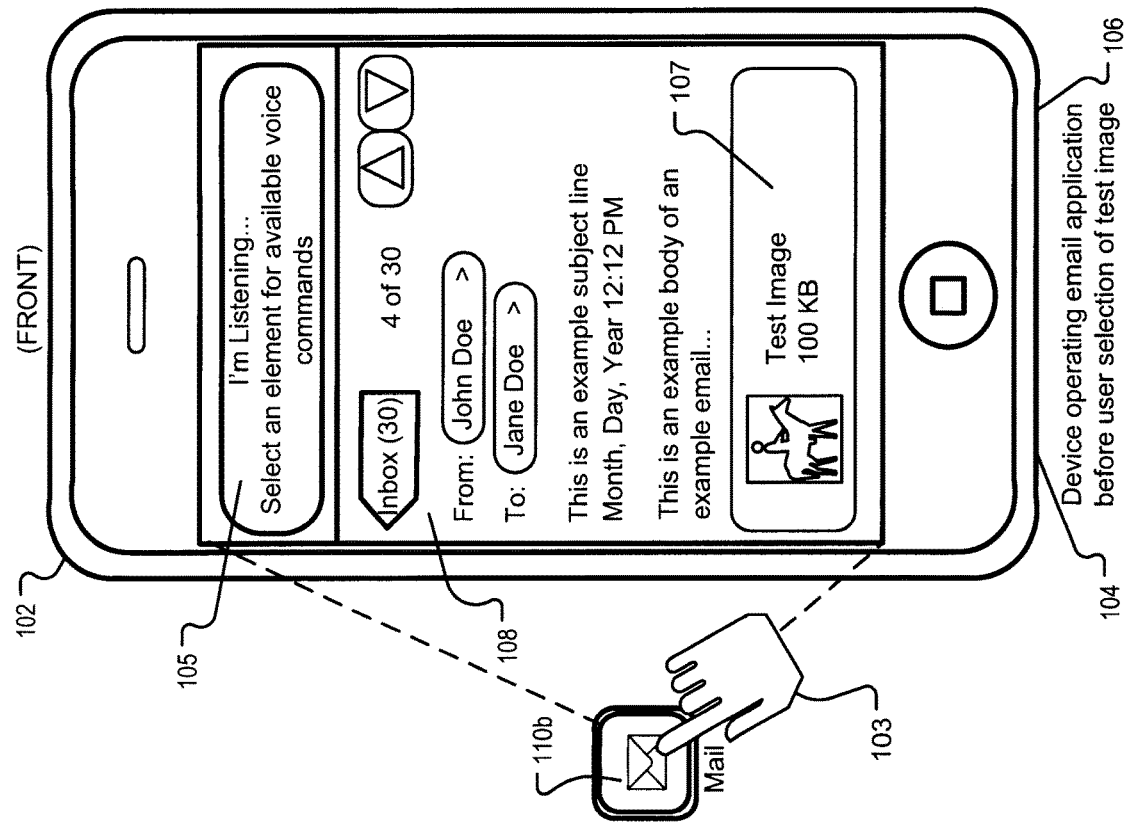

FIGS. 3a and 3b show front views of a data processing device 102 to visualize contextual voice commands in use. From the choice of data items or elements (e.g., icons displayed), the user can select an icon to activate an associated application. The contextual voice command mode is already active at this point using the process illustrated in FIGS. 2a and 2b above. However, in some implementations, the contextual voice command mode can be activated after selecting and initiating one of the available applications. In some implementations, the data processing device can exit the contextual voice command mode in response to a user request to switch from one application to another application. Also, the user can change the focus of interaction from a particular application to a home or main screen (e.g., by pressing a user interface button associated with the main screen) to exit the contextual voice command mode. In another example, the contextual voice command mode can be active while the user's focus is on the main screen. In this example, the data processing device can exit or de-activate the contextual voice command mode when the user changes his focus from the main screen to an application of interest.

User selection of any of these icons loads and initiates the corresponding application on the data processing device 102 to be used by the user. For example, the user can physically touch the email icon 110b through a physical input unit, such as a touch sensor, to select and initiate the email application. When the contextual voice command mode is active, the user can also make a selection using an audio input unit, such as a microphone, with or without a positional input.

Similar to the user selection of the contextual voice command icon, user selection of one of the available icons can be communicated to the user using a visual indication, such as a bolded border, a colored glow, a highlight, different color, etc. Also, an audio indication can be used in addition to, or in place of, the visual indication. For example, an audible, "Email Application" can be played through a speaker for the user to hear.

The application corresponding to the user selected icon is displayed on a display unit 108. For example, FIG. 3a shows an email displayed on the display unit 108 in response to the user selection of the email icon 110b. When the contextual voice command mode is active, a list of available functions for the selected application can be displayed using another visual indication, such as a status bar 105. The status bar 105 can display the list of available functions using any number of visual techniques. For example, the list can be displayed as a scrolling string of text. The list can be divided into groups of N numbers, with N being the number of the functions that can be safely displayed at once. Each group of functions can be displayed in a rotating fashion to display all functions once at the end of each rotation. Also, while the status bar 105 is shown to be displayed at the top of the display unit 108, the status bar 105 can be located anywhere on the display unit 108. In some implementations, the available voice commands or options can be displayed around a particular touch point or user-interface point on the screen. For example, when the user physically touches an interface element or a data item (e.g., an icon representing an application), the available voice command options for that interface element can be shown near the interface element and/or the user's finger. In addition to displaying available functions on the status bar 105, available functions can be provided as audio to be heard by the user. In the example shown in FIG. 3a, the data processing device presents a visual indication that the device is listening for voice commands and the user can select a data item or an element displayed on the screen to obtain voice commands available for the user selected element. Also, the user can request and obtain help using contextual voice commands. For example, when the user requests help with operations available for a data item of interest, the device can present the available operations to the user. The help option is described further below.

On any user interface of any application, the contextual voice command mode can be activated to enable voice commands tailored for specific activities associated with a user selected element. In such manner, the voice commands are specifically based on the context resulting from physical input associated with any portion or element of the screen.

FIG. 3b shows a front view of a data processing device to illustrate cross contextual voice commands in use. The email displayed on the display unit 108 includes a test image 107 attached to the email. The user can select (e.g., using his finger 103 through a touch screen) the test image to bring up a choice of contextual voice commands associated with the selected test image. Each contextual voice command is associated with a corresponding operation that can be performed on the selected test image 107. The corresponding operations can include those for the present context (e.g., email application) or for another context (e.g., image processing application). In response to the user selection of the test image 107, the data processing device 102 uses a status bar 105 to display the choice of available contextual voice commands for the selected test image 107.

Figure 4:
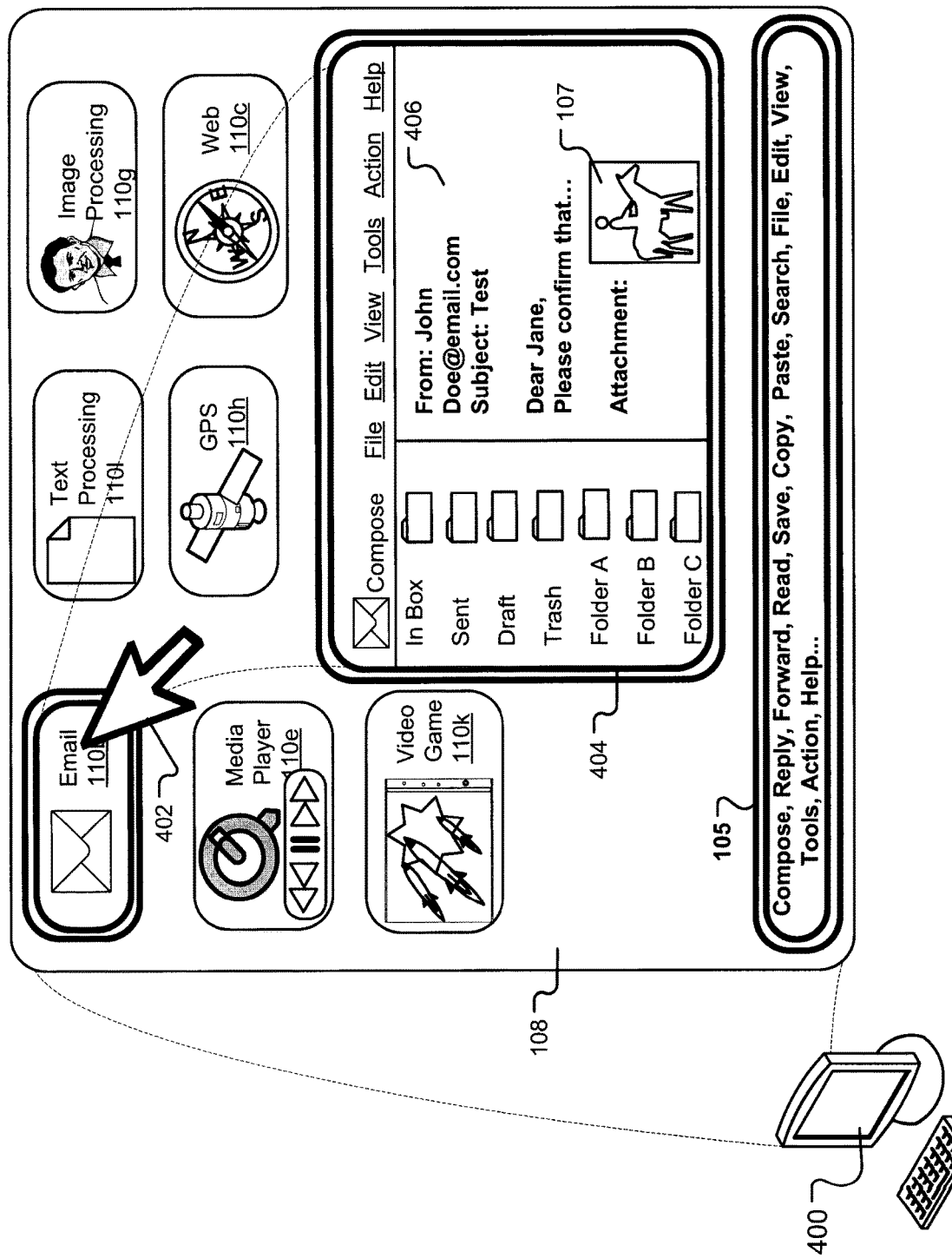
FIG. 4 shows contextual voice commands implemented in another data processing device in an embodiment.

FIG. 4 shows contextual voice commands used in another data processing device. The contextual voice command mode can be implemented in various data processing devices. For example, the data processing device capable of operating the contextual voice command mode can include a personal computer 400. Similar to the mobile device examples shown in FIGS. 1a-3b, the user can select an element (e.g., an email icon 110b) from the display unit 108 to initiate a corresponding application. The example shown in FIG. 4 shows the user selecting the email icon 110b using a mouse pointer 402. In response to this physical input, the corresponding email application is loaded and initiated. The initiated email application is displayed on an active screen 404 that indicates the active application. The active screen 404 includes an email 406 and an image 107 attached to the email. In response to the user selection of the email 406, the personal computer 400 can display a choice of available operations associated with the user selected element (e.g., the email 406) using a status bar 105. For example, FIG. 4 shows an optional status bar 105 that displays the choice of operations that includes "compose, reply, forward, read, save, copy, paste, search, file, edit, view, tools, action, help, etc." However, such visual or audible indication of the list of available commands need not be presented to the user prior to the user issuing a contextual voice command. For example, the voice command module can process the verbal input received from the user and deduce the intent of the user without presenting the list of commands to the user.

Figure 5:
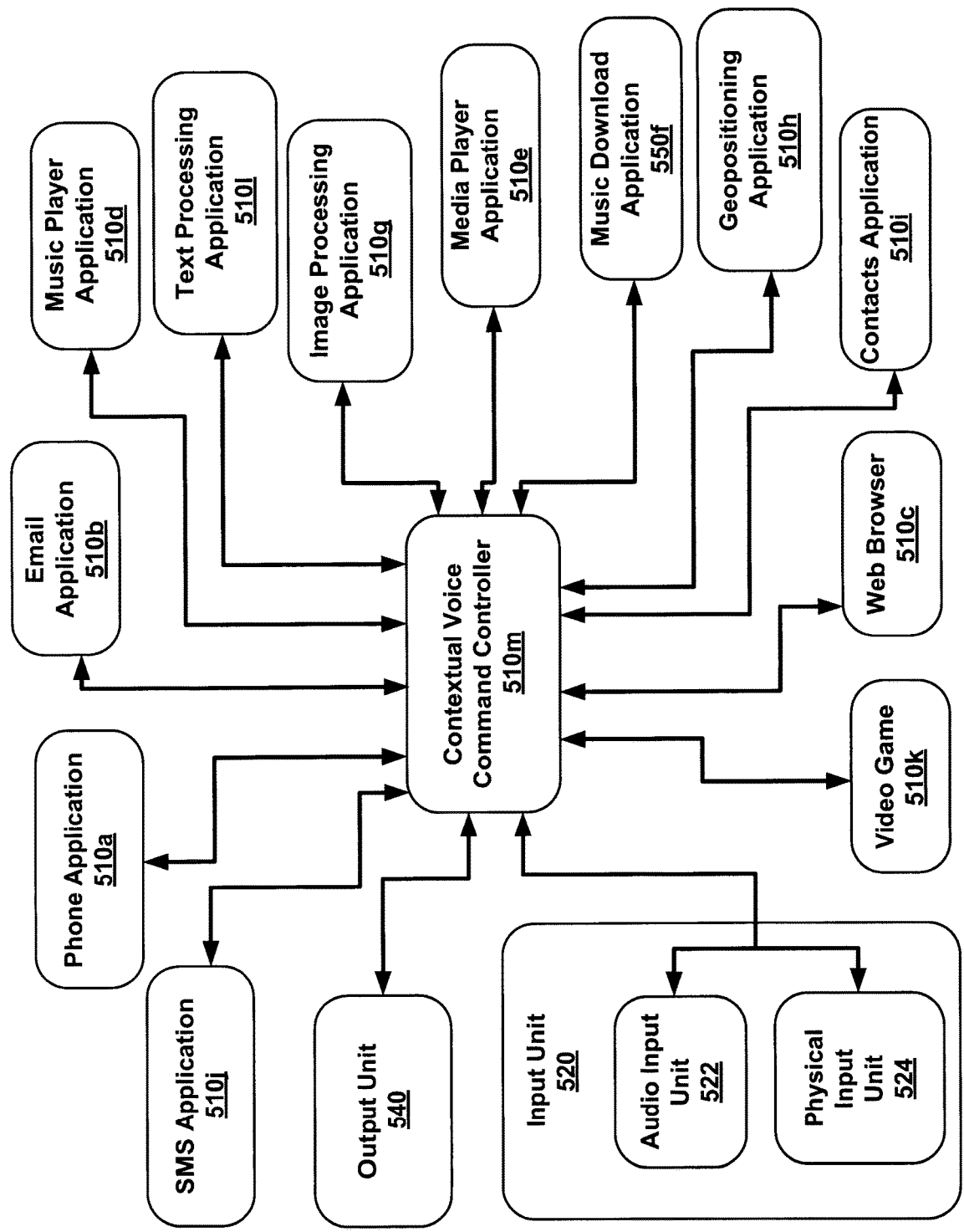
FIG. 5 is a block diagram illustrating a contextual voice command module interfacing with other applications, an input unit and an output unit in an embodiment.

FIG. 5 shows a block diagram illustrating a contextual voice command module interfacing with other applications, an input unit and an output unit. A contextual voice command controller or module 510m can communicate with and control other applications available on a data processing device. Consistent with the examples shown in FIGS. 1a, 1b, 2a, 2b, 3a, 3b and 4, the available applications can include but are not limited to: a phone application 510a, an email application 510b, a Web browser 510c, a music player application 510d, a media player application 150e, a music download application 510f, an image processing application 510g, a geopositioning application 510h, a contacts application 510i, an SMS application 510j, a video game application 510k, and a text processing application 510l. These applications can be loaded and initiated in response to the user selection of the associated icon as shown in FIGS. 2a, 2b, 3a, 3b and 4.

The contextual voice command module 510m receives user input through an input unit 520. The input unit can include an audio input unit 522, such as a microphone, and a physical input unit 524, such as a touch screen. However, other input units can be implemented as described above with respect to FIGS. 1a and 1b. In response to the user input received, the contextual voice command module understands the context of the input (e.g., selected application or a selected element in the selected application) and associated voice command. Based on the received user input, the contextual voice command module 510m controls one or more of the applications and their associated operations or functions.

Figure 6:
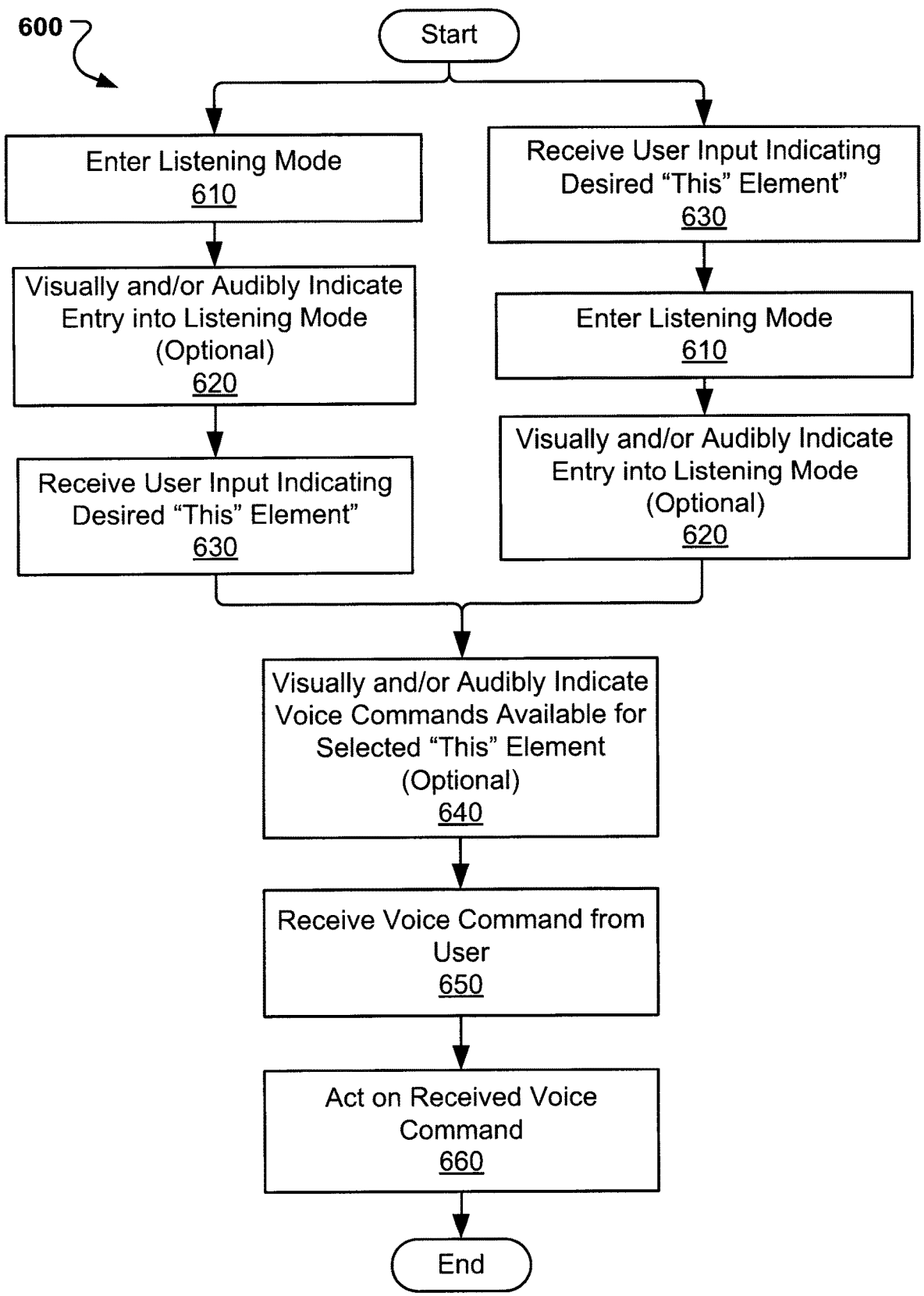
FIG. 6 is a process flow diagram of an example process for implementing contextual voice commands in an embodiment.

FIG. 6 is a flow diagram of an example process 600 for implementing contextual voice commands. The device (e.g., data processing device 102) enters a voice control or listening mode (610). To enter the listening mode, the user can provide a predetermined user input through an input unit. For example, the user can press and hold a physical or virtual button or simply speak a predetermined voice command that triggers the contextual voice command option. For example, a predetermined trigger phrase, such as "device listen" can be used to enter the device into the listening mode. Also, the contextual voice command option can be active as a default, and the user can deactivate the option by providing a predetermined triggering input. For example, the device can exit the listening mode based on a voice input, such as "exit listening mode" or a physical input, such as a touch or a button press. Also, the device can enter and exit the listening mode using a combination of voice and physical inputs. For example, the user can touch a button to initiate entry into or exit from the listening mode and a follow-up voice command, such as "confirm exit or entry" to finalize the entry into or exit from the listening mode.

When entering the listening mode, the device can optionally present a visual and/or audible indication that the device is in the listening mode (620). An example audible indication can be an audio recording played to the user that indicates: "I'm listening and these are words you can say to act on the element." Another example of an audible indication can be a simple sound alert, such as a beep, a ding, a chime or a combination of these. The visual and/or audible indication alerts the user that the device is in listening mode and that the user can provide the desired voice input that represents a corresponding contextual voice command.

When receiving and processing a contextual voice command, a device can operate on a specific element in the context, which may be an indicated element, a currently active element, or an implied element, referred to herein as the element of interest. This element of interest may be referred to within the vocabulary of the voice command processing system by any appropriate term such as "this" or "item" or "current item" or "selection" among many others. In addition, the voice command system may on receiving a keyword, ignore or use additional words as guidance. Thus "email this" or "email selected image" or "email this photo" can be treated similarly because of the use of the keyword "this" or "selected" for the current item of interest.

The device receives a user input that identifies the desired element of interest that provides the context for the contextual voice commands (630). The user can specify and select an element of interest by using any one of the physical input units, such as a touch screen, a mouse, a keyboard, etc. Also, the user can specify and select an element of interest by using an audio input unit to speak the predetermined trigger phrase, such as "the text on third line" or "the image at the bottom" that provide specific direction to what is displayed on the screen. The device need not enter the listening mode before the user makes his selection of the element of interest. When not already in the listening mode, the user can input the predetermined triggering input to enter the device into the listening mode after making the selection of the element of interest.

Additional visual and/or audible indication can be optionally provided to include a list of normal and contextual voice commands available for the selected element of interest (640). For example, a status bar (e.g., status bar 105 in FIGS. 2*b*, 3*a*, 3*b* and 4) can be used to provide a visual indication of the available contextual voice commands. The list of available commands can include non-contextual commands, such as "call person," "read email," "next meeting," etc., and contextual commands, such as "send this to . . . ," "bookmark this," "remind me of this in 2 hours," "delete this," "search Web for this," etc. The contextual voice commands are recognized to be in the context of "this." The term, "this" or "item" or "current item" or "selection" or any similar identifier for the element of interest can relate to the entire displayed screen, the selected active screen, or any element on any screen, or any physical input, such as hardware buttons. The element of interest can be a data item displayed on a screen if the user touched or named the element. The element of interest can be an application specific data item (e.g., "clear list"). Also, the element of interest can be a unit presented on the screen (e.g., "this mail message").

An element of interest can be identified by implication, that is without explicit user indication of the element of interest. For example, if the device is currently displaying an edit screen for a single contact in an address book, no further user input may be needed for the system to process "delete current item" or "delete this" or any similar phrase referring to the item of interest.

The device receives a voice command from the user through an input unit (650). In response to the user selection of the element of interest and the received voice command, the device acts on the received contextual voice command (660). Acting on the received contextual voice command can include performing a set of functions, such as identifying and calling an appropriate application that can act on the user selected element of interest. Also, the device may need to provide additional visual and/or audible indications, such as a list of the functions available for the selected element of interest. The contextual voice command module (see FIGS. 2*a*, 2*b*, 3*a* and 3*b*) understands the context of the element of interest in the contextual voice command based on the user input received through the input device and identifies the corresponding functions available for the element or data item of interest.

The functions or operations available for the selected element or data item of interest can include the functions associated with the active application or context. For an email element, such as an image 107 attached to an email (see FIGS. 3*a* and 3*b*), email application functions or operations are available. The image 382 can be forwarded to another email address, for example. An example command can be "email this image to email@email.com."

In addition, the visual and audible lists for the user selected element can include functions or operations available for any other application or context that can act on the selected element. This allows for context crossover. After selecting an element, the user can provide a contextual voice command in context of the selected element, such as "copy this" or "modify selection" or "delete item" to indicate that the contextual voice command applies to the selected element.

For example, the image 107 can be modified using an image processing application by speaking the predetermined trigger phrase, "modify this image." In response to the contextual voice command, "modify this," the contextual voice command module searches for a list of available applications that can modify the selected image. When more than one application is available, the status bar 105 can be used to display a list of the available applications. Also, the available applications can be played as an audible list. In response to the visual or audible list of applications, the user can speak the name of the desired application to activate that application to modify the selected image.

In such manner, contextual voice commands can be used to act on the user selected element across different contexts. In the example described above, the image 105 displayed in the email context can be used in the image processing context. In another example, a business name in the contacts context can be used in the Web browser context to search the Web for the business name. Using contextual voice commands makes implementing context crossover easier and faster because the user can use simple and intuitive voice commands (e.g., "Google® this business name") instead of a long list of context sensitive menus, buttons, etc.

For example, using touch and/or voice input, the user can make a selection on any screen, such as selecting a block of text in a word processing application context. To perform context crossover for the selected block of text, the user can simply speak the predetermined trigger phrase, such as "email this to email@email.com" or "move this to Web browser" to act on the selected block of text in another context. In contrast to such contextual voice command, a touch user interface requires the user to copy and save the selected block of text, open the email application, compose a new email, find or type the email address, paste the saved block of text into the email, and press the send button.

Also, the user can issue a command such as "email this to John" without leaving the present context or application. For example, in a traditional user interface, the user would need to select the "email this photo" option, and then enter the email address of the person to receive the email in some e-mail user interface, etc. The contextual voice command mode allows the user to issue a command and have the action performed in the background without the user leaving the context of the currently used application. Also, many more operations are at the user's disposal without requiring space on-screen to fit more buttons or add long menus for finding such options.

In some implementations, the user can provide an input to select a data item of interest first. For example, the user can touch or interact with a data item displayed or otherwise cause the data processing device to display a data item of interest on the screen (e.g., select a photo in a photo album to display the selected photo in full screen). Then, the user can instruct the data processing device to enter the contextual voice command mode to interact with the selected data item.

In providing user interaction using audible indication, different user interaction models, such as a confirmation model or a best assumption model can be used.

Figure 7:
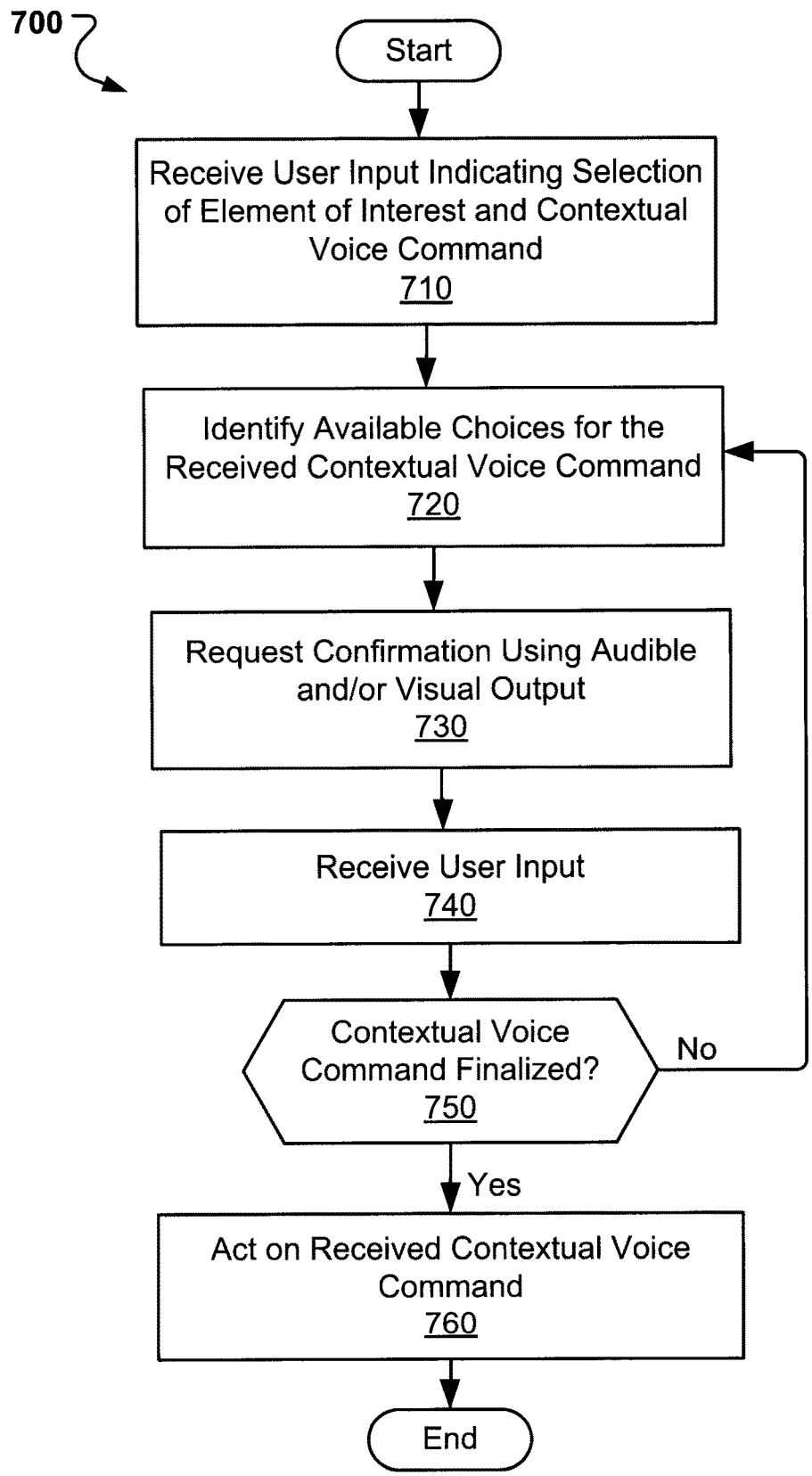
FIG. 7 is a process flow diagram showing an example process for implementing a confirmation model in an embodiment.

FIG. 7 is a process flow diagram showing an example process 700 for implementing a confirmation model. The confirmation model provides audible confirmations in the form of a question in response to each voice input received from the user. The device receives user input indicating the desired element of interest and a contextual voice command related to the context of the element of interest (710). In response to the received contextual voice command, the contextual voice command module identifies the available choices (720) and requests confirmation from the user using audible and/or visual output (730). The device receives another user input in response to the confirmation request (740). The contextual voice command module processes the other received user input to determine whether additional confirmation is needed (e.g., determining if the contextual voice command is finalized) (750). When additional confirmation is needed, the contextual voice command module identifies the available choices (720) and requests confirmation from the user using audible and/or visual output (730). When no additional confirmation is needed (e.g., the contextual voice command is finalized), the device acts on the received contextual voice command (760).

For example, when the user speaks the predetermined trigger phrase, such as "Call John," the device provides the confirmation response, "Which John?" and then provides an audible and/or visual list of all available persons with the name John. The user can select one of the names by speaking the predetermined trigger phrase, such as "This one" or "This John" when using a positional input device to touch the visual indication of the desired John in the list. When strictly relying on voice input, the user can speak the full name of the desired John. In response to the user selection, the device provides the next appropriate confirmation, such as "Ok, which number?" and provides audible and/or visual list of all phone numbers available for the selected John. The user can select from the available phone numbers.

Figure 8A:
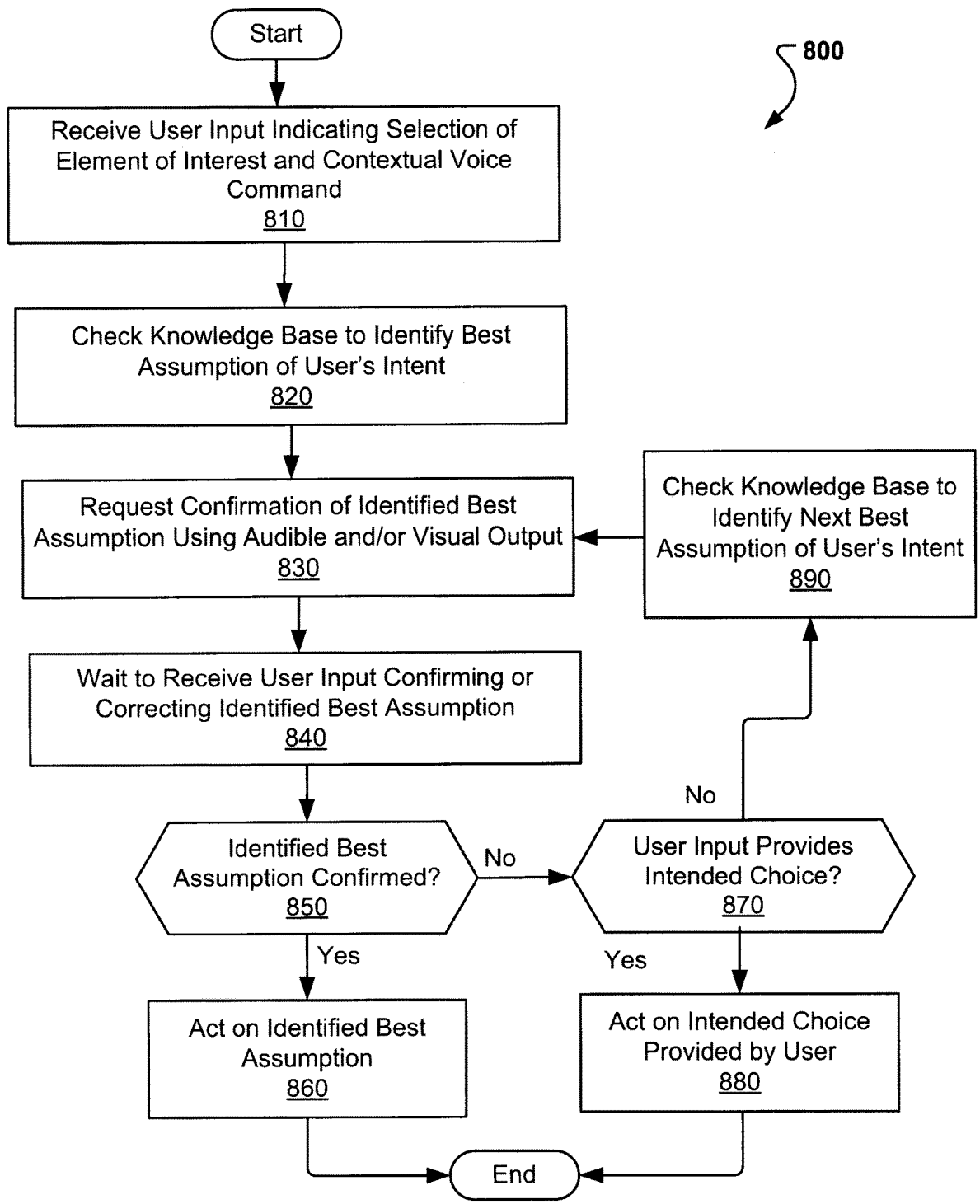
FIG. 8a is a flow diagram showing an example process for implementing a best assumption or learning model in an embodiment.

FIG. 8a is a flow diagram showing an example process 800 for implementing a best assumption or learning model. The best assumption or learning model uses usage or preference history of the user to make the best assumption. Examples of learning models can include but are not limited to: machine learning models, such as support vector machines (SVM), an inductive inference model, concept learning, decision tree learning, Bayesian learning, and others. A machine learning model can be used to develop a process to teach the data processing device to improve its performance based on accumulated data received through an input unit or stored in a database. Such machine learning models can be used to automatically produce a desired result based on rules and patterns designed from the accumulated data. The device receives user input indicating the desired element of interest and contextual voice command (810). The contextual voice command module checks a knowledge base to identify the best assumption or most likely choice of what the user intended (820).

Figure 8B:
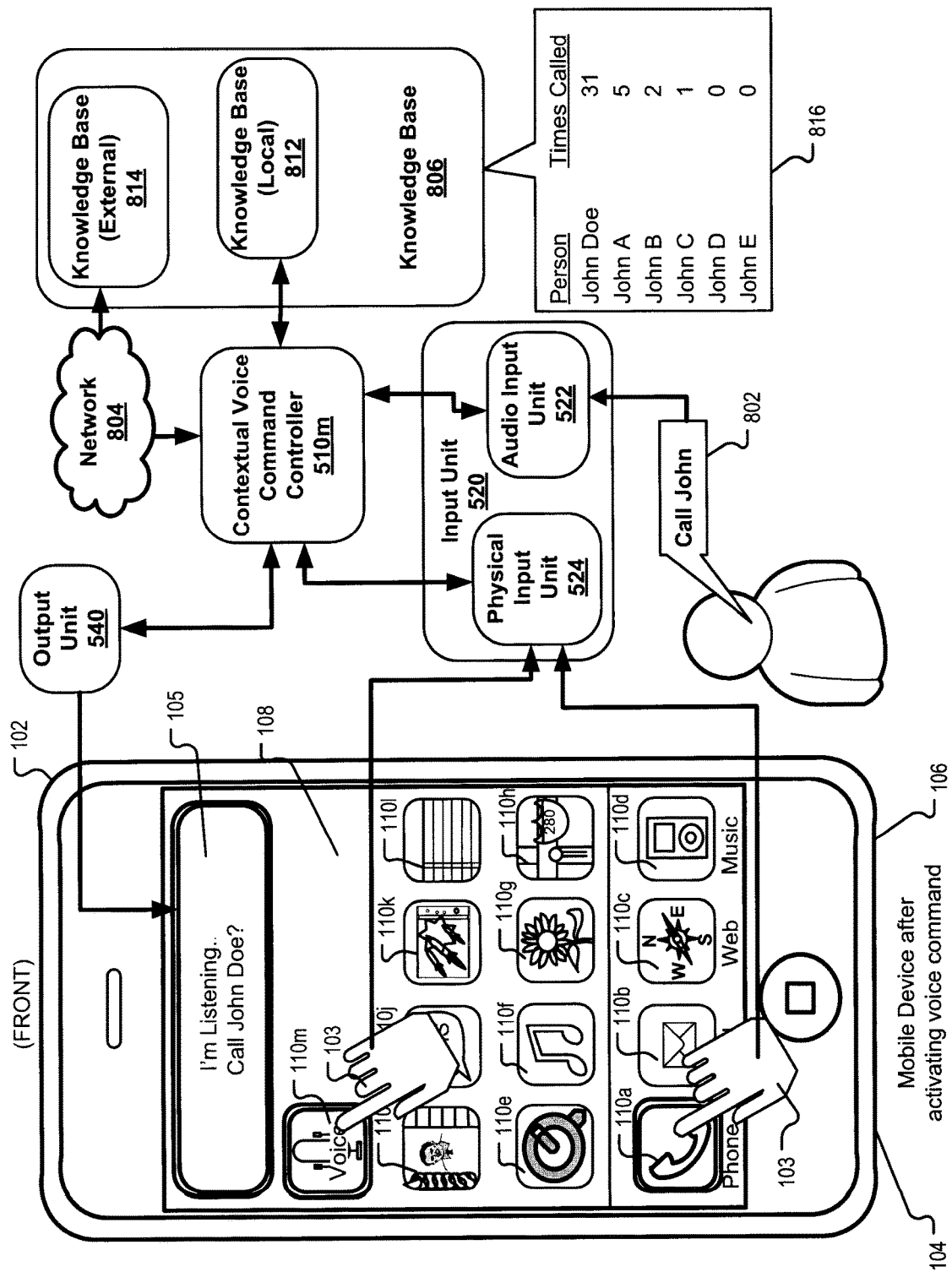
FIG. 8b shows a data processing device accessing a knowledge base to identify the best assumption or most likely choice of what the user intended in an embodiment.

FIG. 8b shows a data processing device accessing a knowledge base to identify the best assumption or most likely choice of what the user intended. In the example shown in FIG. 8b, the contextual voice command mode 510m is active. The user can touch the corresponding contextual voice command icon 110m using his finger 103 through a touch screen, for example. Also, the user selects one of the applications to load and initiate the selected application. In the example shown in FIG. 8b, the phone application 510a is selected in response to the user touching the corresponding phone icon 110a. In the context of the physical input, the user can speak a voice input 802, such as "call John." The physical and voice inputs are received through the respective input units 524 and 522, and the contextual voice command module 510m accesses a knowledge base 806 to identify the best assumption. The knowledge base 806 can include a local knowledge base 812 stored within the data processing device 102 and an external knowledge base 814 located external to the data processing device 102. For example, the data processing device 102 can access the external knowledge base 814 stored on a remote server through a network connectivity 804, such as the Internet.

The knowledge base 806 can include a usage history 816 related to the requested contextual voice command. For example, for the received contextual voice command, "call John," the knowledge base can include a list of persons named John and the number of times each John was called. In the example usage history 816 shown in FIG. 8b, John Doe was called the most times (e.g., 31 times). Thus, the contextual voice command module 510m identifies John Doe as the best assumption of the user's intent. Based on this identification, the contextual voice command module 510m outputs through an output unit 540 (e.g., the status bar 105 of the display unit 108) a message asking the user whether John Doe should be called. In addition, the contextual voice command module can present an audible indication of the same message. In response to this visual and/or audible indication, the user can confirm or correct the assumption.

In some implementations, the knowledge base can include other usage information, and the best assumption can be predicted based on the other usage information. For example, the usage information can include an identity of the John called most recently, an identity of the John called at the same time on previous days, an identity of the John tagged as a favorite, an identity of the John that lives at a certain location, etc.

Referring back to FIG. 8a, the contextual voice command mode conveys to the user the identified best assumption using audible and/or visual output (830). This allows the user to make any correction to the identified assumption. The device waits to receive user input either confirming or correcting the identified best assumption (840). However, a user prompt is not needed. A wait time can be preset or modified to provide an interval of time for the user to cancel or correct the assumed command using utterances, such as "no! John Smith!" or using a physical press of a hardware button to cancel the assumed command. In the absence of a user prompt within the interval time, the device can perform the operation indicated by the best assumption. The contextual voice command module determines whether the user input confirms or corrects the identified best assumption (850). When detecting that the user input is one that confirms the identified best assumption, the device acts on the identified best assumption (860). As described above, a valid confirmation from the user can include a non-response from the user during the time interval.

When detecting that the user input is one that corrects the identified best assumption, the contextual voice command controller determines whether a different assumption or choice should be made (870). When the contextual voice command controller detects that the user has corrected the initially identified best assumption, the contextual voice command controller makes a different assumption based on the user input (880). However, when the contextual voice command controller detects that the user has merely indicated that the identified best assumption is incorrect, the contextual voice command returns to the knowledge base to make the next best assumption (890). The device requests confirmation of the identified next best assumption (830) and the process 800 continues until the user intent is correctly identified.

For example, when the user speaks the predetermined trigger phrase, such as "Call John," the device checks a knowledge base and identifies that the user always (or most of the time, etc.) calls John Doe on his mobile phone. Thus, the device dials the mobile phone number of John Doe. However, the device provides an opportunity for the user to change the command. The device can provide a visual or audible confirmation, such as "Would you like to Call John Doe's mobile." To this, the user can respond by saying "yes" or do nothing for a predetermine duration after receiving a confirmation to dial the number. To change the voice command, the user can speak the predetermined trigger phrase, "No, I meant John Smith." To this response, the device checks the user history and identifies that the user always (or most of the time, etc.) calls John Smith at home. So the device dials that number. By this process, the device builds a knowledge base based on user history so as to reduce the number of ask-and-confirms. Based on this knowledge base, the device can make the best assumption. If the assumption is wrong, the user is asked to correct the assumption.

To build the knowledge base, the user can teach the device to remember certain commands. For example, with the contextual voice command option active, the user can rotate an object by 45 degrees in an image processing application. Initially, the act of rotating the image can be performed using a positional input device. Then, the user can select this rotated object and identify it by saying "an image in 45 degree angle" to teach the device. Next time the user wants to rotate the object by 45 degrees, the user can simply say "an object rotated in 45 degrees."

In addition, macros can be implemented to teach the data processing device. For example, macros can be generated by combining multiple operations into one contextual voice command. The following describes a process for generating an example macro:

Data processing device enters contextual voice command mode.

Contextual voice command module receives a contextual voice command that indicates macro generation, such as "learn this."

Contextual voice command module receives user selection of a data item of interest and contextual voice commands for performing multiple operations, such as "use in a note," "remind me of note in 2 hours," "send note as email to contact group," etc.

Contextual voice command module receives a contextual voice command that indicates end of macro generation, such as "done learning."

Contextual voice command module prompts the user to name the generated macro.

Contextual voice command module receives user input indicating a name for the generated macro, such as "Perform Operations."

Contextual voice command module confirms association of the received name with the generated macro.

End macro generation.

Thus, a macro can be used to associate a sequence of operations with a descriptive name (e.g., "Perform Operations") and teach the data processing device to perform the sequence of operations in response to user utterance of the name. The next time the user desires to perform the same sequence of operations, the user can instruct the data processing device to "Perform Operations" on a selected data item of interest. This learned contextual voice command can be processed by the data processing device to perform the entire sequence of operations on the selected data item of interest.

The sequence learning using programmable macros can be implemented as a separate system that can operate without voice commands. When implemented as a separate system external to the contextual voice command module, the contextual voice command module can be implemented as a layer that controls the separate system.

To expedite the response time, a filter can be implemented to automatically filter out commands that do not make sense or are spoken out of context. For example, in response to the voice command, "Call," the filter can eliminate from the visual and audible indications, the email addresses, home address, etc. In other examples, the contextual voice command controller can be configured to limit a mapping command to street addresses and limit a bookmarking command to URL addresses.

In addition to providing a list of available choices, the visual and audible indications can be used to obtain help at any time. The help available to the user includes helpful suggestions to assist the user in a particular situation. For example, the user may be stuck in a particular application and does not know how to get out of the situation. The user can request help by speaking the predetermined trigger phrase, such as "Help me" or "Help, I'm stuck," for example, to obtain the necessary instruction. The contextual voice controller can output a visual and/or audible message to help the user, such as "You are trying to e-mail this image." Also, the help available to the user includes possible options for acting on the selected element. For example, to find out what the user can do with the selected element, the user can simply ask by speaking the trigger term, such as "What can I do with this?"

During the listening mode, the visual and/or audible indication (e.g., prompts) provided by the device can change in response to each voice input that is received from the user. For example, when the device receives the voice input, "Call John," and the device detects that there are multiple Johns in the phone book, the device plays an audio prompt asking the user to identify: "which John?" Also, the visual indication can change to display the contact information for everyone named John listed in the user's phone book. The contact information displayed can include the name(s) of corresponding phone number(s) (including mobile, home and work phones) for each John. If the user speaks a voice command to select one of the available Johns, such as "John Smith" and John Smith is associated with multiple numbers in the user's phone book, the device can play an audio prompt asking the user to identify: "which number?" and display the names of the multiple numbers (e.g., mobile, work, home) on the screen.

In some implementations, contextual voice commands can be used to receive information or feedback from the device about the selected element of interest. For example, in a media album application, the user can say "Find more about fourth track" to obtain information about that track. Because the user is already in the media album context, the contextual voice command controller knows the context of the command. In non-contextual voice commands, the user would have to specifically identify the name of the artist and the song by saying "find more about the artist X and his song Y," for example. Other types of feedback can be received from the device. For example, the user can speak a predetermined trigger phrase, such as "How long is this" to receive an answer from the device. Also, the user can ask the device to provide other audible feedback by speaking predetermined trigger phrases, such as "read this," "write this," "display this," etc.

As described above, the context of the contextual voice command can be associated with the particular application in which the user selected element resides. In some implementations, the context of the voice commands is also associated with the environment in which the device is used. Examples of such environmental context includes automobile context, navigation context, meeting context, etc.

In the navigation context, the orientation or position of the phone can be used to customize the contextual voice commands for providing direction to the user. The direction can be provided using GPS and a compass. For example, the user can speak the predetermined trigger phrase, such as "which way should I walk?" to receive appropriate direction from the device. The contextual voice command controller can use the GPS and compass based position of the device to provide proper audible direction to the user, such as "turn left," "walk straight," etc. In addition, the user can use the contextual voice commands to obtain directional information from the device. For example, the user can speak the predetermined trigger term, such as "what is this device pointing at" or "what am I looking at" or "What is to the left of me?" or "What is to the right of me?" or "what is ahead of me" or "what is ahead" or "what is behind me" or "which way to destination" or "how far away is destination," etc. In these examples, the orientation of the device can be a contextual element. These types of triggering phrases can be predetermined to cause the device to trigger the appropriate navigation related applications.

For certain situations, such as the automobile context, in which the user is unable to provide input through a positional input device, an audible feedback mechanism can be customized for voice intensive interaction. For example, the contextual voice command controller can simplify the audible response sent from the device based on the context, such as driving context. For example, instead of the contextual voice command controller providing audible outputs, such as "We have multiple names, which one do you want?" to provide a list of choices, the audible response from the device can be narrowed to simple Yes-No scenarios. For example, the device can ask, "Do you want this? Yes or No." Such simple Yes-No response is easier for the user to use when driving, for example.

The device can be made aware of such context using various mechanisms. For example, the device can detect that the user is using a Bluetooth device to provide the voice input. Also, the device can detect that the device is plugged into an input/output jack of an automobile stereo. Also, the user can press, touch, or press-and-hold a physical or virtual button to indicate such context. In addition, the device can detect that the device is moving using GPS and/or a compass. For example, when located inside a moving vehicle, the location of the device can change with respect to time. This movement or change in the location of the device can be detected and used to trigger the different modes of feedback.

The voice of the audible output generated by the contextual voice command controller can be changed by installing different voices. Also, different voices can be used for different context. Moreover, the techniques, apparatus and systems described in this specification can be extended to any spoken language, including specialized command languages. For example, the voice commands (contextual and non-contextual) can be implemented to allow the device to recognize English, French, German, Korean, Chinese (Mandarin and Cantonese), Japanese, Italian, Spanish, Farsi, etc. Also, any of these spoken languages can be used to generate specialized command languages, such as a set of commands designed to elicit efficient response from the device.

Contextual voice commands are not limited to current functionalities, but rather can be adapted to control future functionalities. For example, any additional functionalities of the device can be controlled under a contextual voice command module. This is possible by implementing a contextual voice command module as a plug-in to the new functionalities. Also, third party developers can be provided with an option (e.g., using a software development kit (SDK)) to indicate to the system that additional non-contextual and contextual commands are available.

Figure 9:
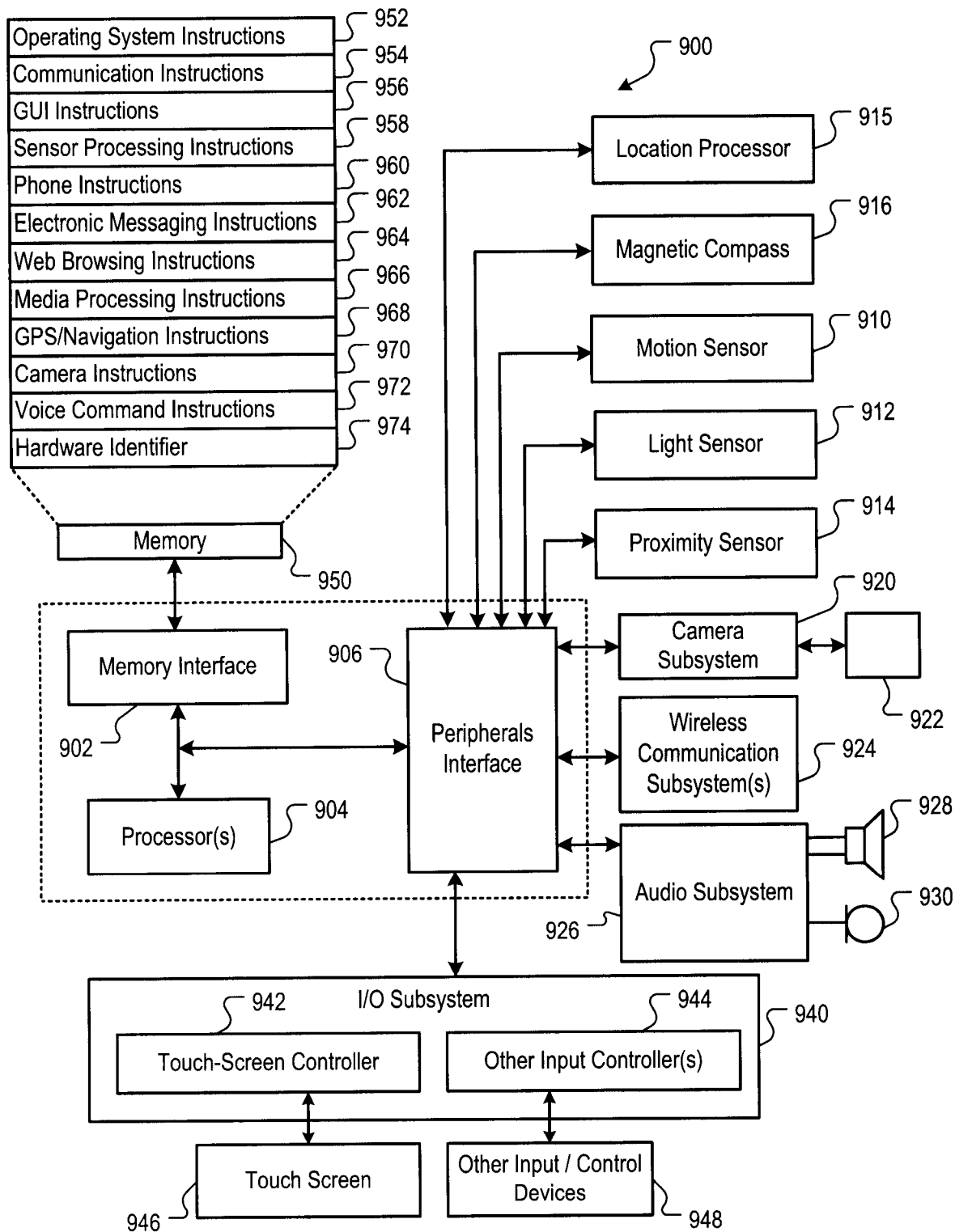
FIG. 9 is a block diagram of example architecture of a data processing device in an embodiment.

FIG. 9 is a block diagram of example architecture 900 of a data processing device. The data processing devices 102 and 400 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. Various components in the data processing devices 102 and 400 can be coupled together by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate the orientation, lighting, and proximity functions. A location processor 915 (e.g., GPS receiver) can be connected to the peripherals interface 906 to provide geopositioning. A magnetic compass integrated circuit 916 can also be connected to the peripherals interface 906 to provide orientation (e.g., to determine the direction of due North).

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the data processing devices 102 and 400 is intended to operate. For example, data processing devices 102 and 400 may include communication subsystems 924 designed to operate over a GSM network, a GPRS network, an EDGE network, a Wi-Fi or WiMax network, and a Bluetooth™ network. In particular, the wireless communication subsystems 924 may include hosting protocols such that the data processing devices 102 and 400 may be configured as a base station for other wireless devices.

An audio subsystem 926 can be coupled to a speaker 928 and a microphone 930 to facilitate voice-enabled functions, such as voice recognition, voice replication, digital recording, and telephony functions.

The I/O subsystem 940 can include a touch screen controller 942 and/or other input controller(s) 944 as described with respect to FIGS. 1a and 1b. For example, the I/O subsystem 940 can include a microphone (internal and/or external), a speaker and a voice command recognition engine. The I/O subsystem 940 can receive voice commands and present audio outputs over full duplex communication. For example, transport technologies other than regular cellular voice communications, such as voice over IP, can be implemented.

Also, voice commands can be processed using a two-pass process. The on-device voice command module can process the received voice commands to perform a generalized recognition. Audio data of the received voice commands can be sent to a server to provide a more detailed and accurate processing. The server may be better equipped (e.g., using a faster and more powerful processor) to perform voice command recognition than a mobile device. To reduce bandwidth requirements and latency issues, the audio data may not be sent to the server in its entirety. For example, the on-device voice command module can process the voice commands to identify strings of numbers, but may not be able to identify the exact voice commands. Thus, the on-device voice command module may determine that the voice commands or utterance contain "some numbers." A larger surrounding segment of the audio data can be sent to the server, and the server can asynchronously return a much better idea of what was actually said in the voice commands. By using the server in such manner, the benefits of server processing can be obtained while reducing or minimizing the costs involved with the server processing.

The touch-screen controller 942 can be coupled to a touch screen 946. The touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration may disengage a lock of the touch screen 946; and a pressing of the button for a second duration that is longer than the first duration may turn power to the data processing devices 102 and 400 on or off. The user may be able to customize a functionality of one or more of the buttons. The touch screen 946 can, for example, also be used to implement virtual or soft buttons and/or a keyboard.

In some implementations, the data processing devices 102 and 400 can present recorded audio and/or video files, such as MP3, AAC, and MPEG files. In some implementations, the data processing devices 102 and 400 can include the functionality of an MP3 player, such as an iPod Touch™.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks. The operating system 952 may include instructions for handling basic system services and for performing hardware dependent tasks. In some implementations, the operating system 952 can be a kernel (e.g., UNIX kernel).

The memory 950 may also store communication instructions 954 to facilitate communicating with one or more additional devices, one or more computers and/or one or more servers. The memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; and voice command instructions 972 to facilitate operation of the data processing device 102 using contextual voice commands, as described in reference to FIGS. 1a, 1b, 2a, 2b, 3a and 3b. In some implementations, the GUI instructions 956 and/or the media processing instructions 966 implement the features and operations described in reference to FIGS. 1-8.

The memory 950 may also store other software instructions (not shown), such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) 974 or similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the data processing devices 102 and 400 may be implemented in hardware and/or in software, including in one or more signal processing and/or application specific integrated circuits.

The techniques for implementing the contextual voice commands as described in FIGS. 1-9 may be implemented using one or more computer programs comprising computer executable code stored on a tangible computer readable medium and executing on the data processing device 102. The computer readable medium may include a hard disk drive, a flash memory device, a random access memory device such as DRAM and SDRAM, removable storage medium such as CD-ROM and DVD-ROM, a tape, a floppy disk, a Compact Flash memory card, a secure digital (SD) memory card, or some other storage device. In some implementations, the computer executable code may include multiple portions or modules, with each portion designed to perform a specific function described in connection with FIGS. 6-8. In some implementations, the techniques may be implemented using hardware such as a microprocessor, a microcontroller, an embedded microcontroller with internal memory, or an erasable, programmable read only memory (EPROM) encoding computer executable instructions for performing the techniques described in connection with FIGS. 6-8. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the systems apparatus and techniques described here can be implemented on a data processing device having a display device (e.g., a CRT (cathode ray tube) or LCD (liquid crystal display) monitor) for displaying information to the user and a positional input device, such as a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method including:
   displaying, at a data processing device, a data item in a first application context, the first application context being associated with a currently active application;
   receiving, at the data processing device, an input indicative of a selection of the data item;
   receiving, at the data processing device; a first voice input including an operation to be performed and associating the selected data item with an identifier comprising a keyword, the operation being associated with a second application context;
   in response to receiving the first voice input, providing a list of available applications configured to perform the operation;
   receiving a second voice input including a selection of at least one of the list of available applications; and
   performing the operation included in the first voice input on the data item to which the keyword included in the first voice input is associated while displaying the data item in the first application context, the operation being performed utilizing the at least one of the list of available applications selected in the second voice input.

2. The method of claim 1, wherein the voice input is a first voice input, wherein the identifier is a first identifier, and the keyword is a first keyword, the method further comprising:
   receiving an input modifying the data item; and
   receiving a second voice input associating the modified data item with a second identifier, wherein the second identifier comprises a second keyword corresponding to the modification.

3. The method of claim 1, further comprising:
   detecting the presence of one or more words from a plurality of predetermined words, wherein the predetermined words includes the keyword.

4. The method of claim 3, wherein at least a word of the plurality of predetermined words is application-specific.

5. The method of claim 1, further comprising:
in response to receiving the input indicative of a selection of the data item, providing an output indicative of a plurality of operations that can be performed on the data item.

6. The method of claim 5, wherein the output includes an audio output, a visual output, or a combination thereof.

7. The method of claim 1, wherein the input indicative of a selection of the data item includes a speech input.

8. The method of claim 1, wherein receiving the voice input includes receiving the voice input while the data processing device is in a listening mode.

9. An electronic device, comprising:
a display;
one or more processors;
one or more sensors; and
a memory storing one or more programs configured to be executed one or more processors, the one or more programs including instructions for:
displaying, at a data processing device, a data item in a first application context, the first application context being associated with a currently active application;
receiving an input indicative of a selection of the data item;
receiving a first voice input including an operation to be performed and associating the selected data item with an identifier comprising a keyword, the operation being associated with a second application context;
in response to receiving the first voice input, providing a list of available applications configured to perform the operation;
receiving a second voice input including a selection of at least one of the list of available applications; and
performing the operation included in the first voice input on the data item to which the keyword included in the first voice input is associated while displaying the data item in the first application context, the operation being performed utilizing the at least one of the list of available applications selected in the second voice input.

10. The electronic device of claim 9, wherein the voice input is a first voice input, wherein the identifier is a first identifier, and the keyword is a first keyword, the one or more programs further include instructions for:
receiving an input modifying the data item; and
receiving a second voice input associating the modified data item with a second identifier, wherein the second identifier comprises a second keyword corresponding to the modification.

11. The electronic device of claim 9, wherein the one or more programs further include instructions for:
detecting the presence of one or more words from a plurality of predetermined words, wherein the predetermined words includes the keyword.

12. The electronic device of claim 11, wherein at least a word of the plurality of predetermined words is application-specific.

13. The electronic device of claim 9, wherein the one or more programs further include instructions for:
in response to receiving the input indicative of a selection of the data item, providing an output indicative of a plurality of operations that can be performed on the data item.

14. The electronic device of claim 13, wherein the output includes an audio output, a visual output, or a combination thereof.

15. The electronic device of claim 9, wherein the input indicative of a selection of the data item includes a speech input.

16. The electronic device of claim 9, wherein the one or more programs further include instructions for:
receiving the voice input includes receiving the voice input while the data processing device is in a listening mode.

17. A non-transitory computer-readable storage medium storing one or more programs configured to be executed by one or more processors of an electronic device with a display, the one or more programs including instructions for:
displaying a data item in a first application context, the first application context being associated with a currently active application;
receiving an input indicative of a selection of the data item;
receiving a first voice input including an operation to be performed and associating the selected data item with an identifier comprising a keyword, the operation being associated with a second application context;
in response to receiving the first voice input, providing a list of available applications configured to perform the operation;
receiving a second voice input including a selection of at least one of the list of available applications; and
performing the operation included in the first voice input on the data item to which the keyword included in the first voice input is associated while displaying the data item in the first application context; the operation being performed utilizing the at least one of the list of available applications selected in the second voice input.

18. The non-transitory computer readable storage medium of claim 17, wherein the voice input is a first voice input, wherein the identifier is a first identifier, and the keyword is a first keyword, the one or more programs further include instructions for:
receiving an input modifying the data item; and
receiving a second voice input associating the modified data item with a second identifier, wherein the second identifier comprises a second keyword corresponding to the modification.

19. The non-transitory computer readable storage medium of claim 17, wherein the one or more programs further include instructions for:
detecting the presence of one or more words from a plurality of predetermined words, wherein the predetermined words includes the keyword.

20. The non-transitory computer readable storage medium of claim 19, wherein at least a word of the plurality of predetermined words is application-specific.

21. The non-transitory computer readable storage medium of claim 17, wherein the one or more programs further include instructions for:
in response to receiving the input indicative of a selection of the data item, providing an output indicative of a plurality of operations that can be performed on the data item.

22. The non-transitory computer readable storage medium of claim 21, wherein the output includes an audio output, a visual output, or a combination thereof.

23. The non-transitory computer readable storage medium of claim 17, wherein the input indicative of a selection of the data item includes a speech input.

24. The non-transitory computer readable storage medium of claim 17, wherein the one or more programs further include instructions for:
  receiving the voice input includes receiving the voice input while the data processing device is in a listening mode.

\* \* \* \* \*

UNITED STATES PATENT AND TRADEMARK OFFICE
CERTIFICATE OF CORRECTION

PATENT NO. : 10,540,976 B2
APPLICATION NO. : 12/479477
DATED : January 21, 2020
INVENTOR(S) : Marcel Van Os et al.

Page 1 of 1

It is certified that error appears in the above-identified patent and that said Letters Patent is hereby corrected as shown below:

In the Claims

In Column 18, Line 36, Claim 1, delete "device;" and insert -- device, --, therefor.

In Column 19, Line 19, Claim 9, after "executed" insert -- by the --, therefor.

In Column 20, Line 35, Claim 17, delete "context;" and insert -- context, --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*